(12) United States Patent
Park et al.

(10) Patent No.: US 11,611,604 B2
(45) Date of Patent: *Mar. 21, 2023

(54) METHOD AND APPARATUS FOR RECEIVING STREAMING VIA TRANSPORT PROTOCOL IN WIRELESS COMMUNICATION SYSTEM

(71) Applicant: LG ELECTRONICS INC., Seoul (KR)

(72) Inventors: Giwon Park, Seoul (KR); Byungjoo Lee, Seoul (KR); Dongcheol Kim, Seoul (KR); Youngjun Jo, Seoul (KR); Taesung Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/345,456

(22) Filed: Jun. 11, 2021

(65) Prior Publication Data

US 2021/0306400 A1 Sep. 30, 2021

Related U.S. Application Data

(63) Continuation of application No. 16/082,524, filed as application No. PCT/KR2017/002433 on Mar. 7, 2017, now Pat. No. 11,064,003.

(Continued)

(51) Int. Cl.
*G06F 15/16* (2006.01)
*H04L 65/65* (2022.01)
(Continued)

(52) U.S. Cl.
CPC .......... *H04L 65/65* (2022.05); *H04L 65/1069* (2013.01); *H04L 67/104* (2013.01); *H04W 76/14* (2018.02)

(58) Field of Classification Search
None
See application file for complete search history.

(56) References Cited

U.S. PATENT DOCUMENTS 9,021,134 B1 4/2015 Patel
2003/0236905 A1 12/2003 Choi et al.
(Continued)

FOREIGN PATENT DOCUMENTS

KR 1020150095768 8/2015
WO 2015119337 8/2015

OTHER PUBLICATIONS

United States Patent and Trademark Office U.S. Appl. No. 16/082,524, Office Action dated Mar. 5, 2020, 14 pages.
(Continued)

*Primary Examiner* — Dustin Nguyen
(74) *Attorney, Agent, or Firm* — Lee Hong Degerman Kang Waimey

(57) ABSTRACT

The present specification may provide a method for a sink device receiving a streaming from a source device in a wireless communication system. In this regard, the method for receiving streaming may comprise the steps of: receiving from the source device streaming over a first transport protocol; transmitting to the source device a first message including information regarding a transport protocol of the sink device when the first transport protocol connection is disconnected; receiving from the source device a second message including information regarding a transport protocol of the source device; and receiving from the source device the streaming over one of the first transport protocol and a second transport protocol.

20 Claims, 24 Drawing Sheets

Related U.S. Application Data

(60) Provisional application No. 62/304,902, filed on Mar. 7, 2016, provisional application No. 62/313,140, filed on Mar. 25, 2016, provisional application No. 62/318,787, filed on Apr. 6, 2016, provisional application No. 62/345,000, filed on Jun. 3, 2016, provisional application No. 62/349,117, filed on Jun. 13, 2016.

(51) Int. Cl.
  *H04L 67/104* (2022.01)
  *H04W 76/14* (2018.01)
  *H04L 65/1069* (2022.01)

(56) References Cited

U.S. PATENT DOCUMENTS

| | | |
|---|---|---|
| 2007/0118618 A1 | 5/2007 | Kisel et al. |
| 2007/0211728 A1 | 9/2007 | Kim et al. |
| 2009/0217328 A1 | 8/2009 | Colmagro et al. |
| 2010/0177735 A1 | 7/2010 | Bihannic et al. |
| 2010/0313082 A1 | 12/2010 | Kim et al. |
| 2011/0138022 A1 | 6/2011 | Xie et al. |
| 2013/0195119 A1 | 8/2013 | Huang et al. |
| 2013/0223538 A1 | 8/2013 | Wang et al. |
| 2013/0346562 A1 | 12/2013 | Kim |
| 2014/0365611 A1 | 12/2014 | Praveenkumar et al. |
| 2015/0172757 A1 | 6/2015 | Kafle et al. |
| 2015/0295982 A1 | 10/2015 | Kafle et al. |
| 2016/0219606 A1 | 7/2016 | Amano et al. |
| 2018/0048701 A1 | 2/2018 | Iwami et al. |
| 2019/0089763 A1 | 3/2019 | Park et al. |

OTHER PUBLICATIONS

United States Patent and Trademark Office U.S. Appl. No. 16/082,524, Final Office Action dated Sep. 17, 2020, 12 pages.
United States Patent and Trademark Office U.S. Appl. No. 16/082,524, Notice of Allowance dated Mar. 10, 2021, 11 pages.
PCT International Application No. PCT/KR2017/002433, Written Opinion of the International Searching Authority dated Jun. 12, 2017, 21 pages.

First WFD device (Cellular phone)     Second WFD device (display device)

METHOD AND APPARATUS FOR RECEIVING STREAMING VIA TRANSPORT PROTOCOL IN WIRELESS COMMUNICATION SYSTEM

CROSS-REFERENCE TO RELATED APPLICATIONS

This application is a continuation of U.S. patent application Ser. No. 16/082,524, filed on Sep. 5, 2018, now U.S. Pat. No. 11,064,003, which is the National Stage filing under 35 U.S.C. 371 of International Application No. PCT/KR2017/002433, filed on Mar. 7, 2017, which claims the benefit of U.S. Provisional Application No. 62/304,902, filed on Mar. 7, 2016, 62/313,140, filed on Mar. 25, 2016, 62/318,787, filed on Apr. 6, 2016, 62/345,000, filed on Jun. 3, 2016, and 62/349,117, filed on Jun. 13, 2016, the contents of which are all hereby incorporated by reference herein in their entirety.

TECHNICAL FIELD

The present disclosure relates to a wireless communication system and, more particularly, to a method and apparatus for providing streams over a transport in a wireless communication system.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

In addition, recently, with the development of information communication technology, various wireless communication technologies have been developed. Of the technologies, wireless LAN (WLAN) is the technology that allows home or company or a specific service zone to access Internet wirelessly by using a portable terminal such as a personal digital assistant (PDA), a lap top computer, a portable multimedia player (PMP).

WLAN Standards have been developed as Institute of Electrical and Electronics Engineers (IEEE) 802.11. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps. IEEE 802.11p corresponds to a standard for supporting WAVE (wireless access in vehicular environments). For instance, 802.11p provides improvement necessary for supporting ITS (intelligent transportation systems). IEEE 802.11ai corresponds to a standard for supporting fast initial link setup of IEEE 802.11 station.

A direct link setup (DLS) related protocol under the environment according to IEEE 802.11e is based on QBSS (Quality BSS (basic service set)) that BSS supports QoS (Quality of Service). In QBSS, AP as well as non-AP STA is a QAP (Quality AP) that supports QoS. However, under the WLAN environment (for example, WLAN environment according to IEEE 802.11a/b/g) which is currently commercialized, although the non-AP STA is a QSTA (Quality STA) that supports QoS, the AP is likely to be a legacy AP that fails to support QoS. As a result, there is a limitation that DLS service cannot be used even in case of the QSTA under the WLAN environment which is currently commercialized.

In a recent situation that such a wireless short-range communication technology as Wi-Fi and the like is widely applied to a market, connection between devices is performed not only based on a local network but also based on direct connection between devices. One of technologies enabling devices to be directly connected is Wi-Fi Direct.

Wi-Fi Direct corresponds to a network connectivity standard technology describing up to operations of a link layer. Since there is no definition on a regulation or a standard for an application of a higher layer, it is difficult to have compatibility and consistency of an operation after Wi-Fi Direct devices are connected with each other. For this reason, such a standard technology including higher layer application technology as WFDS (Wi-Fi Direct service) is under discussion by WFA (Wi-Fi alliance).

The WFA has announced such a new standard for delivering data via a direct connection between mobile devices as Wi-Fi Direct. Hence, related industries are actively developing a technology for satisfying the Wi-Fi Direct standard. In a strict sense, the Wi-Fi Direct is a marketing terminology and corresponds to a brand name. A technology standard for the Wi-Fi Direct is commonly called Wi-Fi P2P (peer to peer). Hence, the present invention describing Wi-Fi-based P2P technology may be able to use Wi-Fi Direct and Wi-Fi P2P without any distinction. In a legacy Wi-Fi network, a user accesses the legacy Wi-Fi network via an AP (access point) and accesses the Internet to use a device on which Wi-Fi is mounted. A data communication method via direct connection between devices is also used in a legacy communication by some users in a manner of being mounted on a device (e.g., a cellular phone, a note PC, etc.) on which a wireless communication technology such as Bluetooth is mounted. Yet, according to the data communication method, transmission speed is slow and transmission distance is limited to within 10 m. In particular, when the data communication method is used for transmitting massive data or is used in environment at which many Bluetooth devices exist, there exists a technical limit in performance capable of being felt by a user.

Meanwhile, Wi-Fi P2P maintains most of functions of the legacy Wi-Fi standard and includes an additional part for supporting direct communication between devices. Hence, the Wi-Fi P2P can sufficiently utilize hardware and physical characteristics of a device on which a Wi-Fi chip is mounted and is able to provide device-to-device P2P communication by upgrading a software function only.

As widely known, the device on which the Wi-Fi chip is mounted is extending to various ranges including a note PC, a smartphone, a smart TV, a game console, a camera and the like. For the device, sufficient numbers of suppliers and technology development personnel have been formed. Yet, software development supporting the Wi-Fi P2P standard is not vitalized yet. This is because, although a Wi-Fi P2P standard is announced, related software capable of conveniently using the Wi-Fi P2P standard is not distributed.

DETAILED DESCRIPTION OF THE INVENTION

Technical Problems

The present disclosure provides a method and apparatus for providing streams over a transport in a wireless communication system.

An object of the present disclosure is to provide a transport switching method in a wireless communication system.

Another object of the present disclosure is to provide a transport recovery method in a wireless communication system.

Technical Solutions

According to an aspect of the present disclosure, provided herein is a method for receiving streaming from a source device by a sink device in a wireless communication system. The method may include receiving the streaming from the source device over a first transport, transmitting a first message including transport related information of the sink device to the source device when the first transport is disconnected, receiving a second message including transport related information of the source device from the source device, and receiving the streaming over either the first transport or a second transport from the source device.

In another aspect of the present disclosure, provided herein is a sink device for receiving a stream in a wireless communication system. The sink device may include a reception module configured to receive information from an external device, a transmission module configured to transmit the information to the external device, and a processor configured to control the reception module and the transmission module. The processor may receive the streaming from a source device over a first transport, transmit a first message including transport related information of the sink device to the source device when the first transport is disconnected, receive a second message including transport related information of the source device from the source device, and receive the streaming over either the first transport or a second transport from the source device.

The following may be commonly applied to the method and the sink device.

In each aspect of the present disclosure, the first message may be a message for requesting switching to the second transport, and the sink device may receive the stream from the source device over the switched second transport when the sink device receives the second message as a response to the first message.

In each aspect of the present disclosure, the first message may include port information about second transport of the sink device and the second message may include the port information about the second transport of the sink device and port information about second transport of the source device.

In each aspect of the present disclosure, the second message may further include information indicating whether to permit the switching and the sink device may receive the streaming from the source device over the second transport only when the second message indicates that the switching is permitted.

In each aspect of the present disclosure, the source device may transmit a third message to the sink device when the first transport is disconnected by the source device, and wherein the sink device may transmit the first message to the source device after transmitting a fourth message to the source device as a response to the third message.

In each aspect of the present disclosure, the first message may be a message for performing recovery of the first transport, and the sink device may receive the streaming from the source device over the recovered first transport when the sink device receives the second message as a response to the first message.

In each aspect of the present disclosure, the first message may include port information about first transport of the sink device and the second message may include the port information about the first transport of the sink device and port information about first transport of the source device.

In each aspect of the present disclosure, the second message may further include information indicating whether to permit the recovery, and wherein the sink device may receive the streaming from the source device over the first transport only when the second message indicates permission of the recovery.

In each aspect of the present disclosure, the sink device may transmit the first message to the source device when the sink device receives a third message from the source device and transmits a fourth message to the source device.

In each aspect of the present disclosure, the third message may be a message for triggering transmission of the first message.

In each aspect of the present disclosure, the sink device may receive the streaming from the source device over either the first transport or the second transport after receiving the second message and performing a capability negotiation procedure with the source device.

In each aspect of the present disclosure, the first message may be a Real-Time Stream Protocol (RTSP) M6 request message and the second message may be an RTSP M6 response message.

In each aspect of the present disclosure, the second transport may be configured as a Transmission Control Protocol (TCP) when the first transport is a User Datagram Protocol (UDP), and wherein the second transport may be configured as the UDP when the first transport is the TCP.

In each aspect of the present disclosure, the source device may be a Wi-Fi Display (WFD) source device and the sink device may be a WFD sink device.

Advantageous Effects

According to the present disclosure, a method and apparatus for providing streaming over a transport in a wireless communication system can be provided.

According to the present disclosure, a transport switching method in a wireless communication system can be provided.

According to the present disclosure, a transport recovery method in a wireless communication system can be provided.

The effects that may be obtained by the present invention are not limited to the above-mentioned effects, and other effects not mentioned herein may be clearly understood from the following description by those skilled in the art to which the present invention pertains.

BEST MODE FOR CARRYING OUT THE INVENTION

Figure 1:
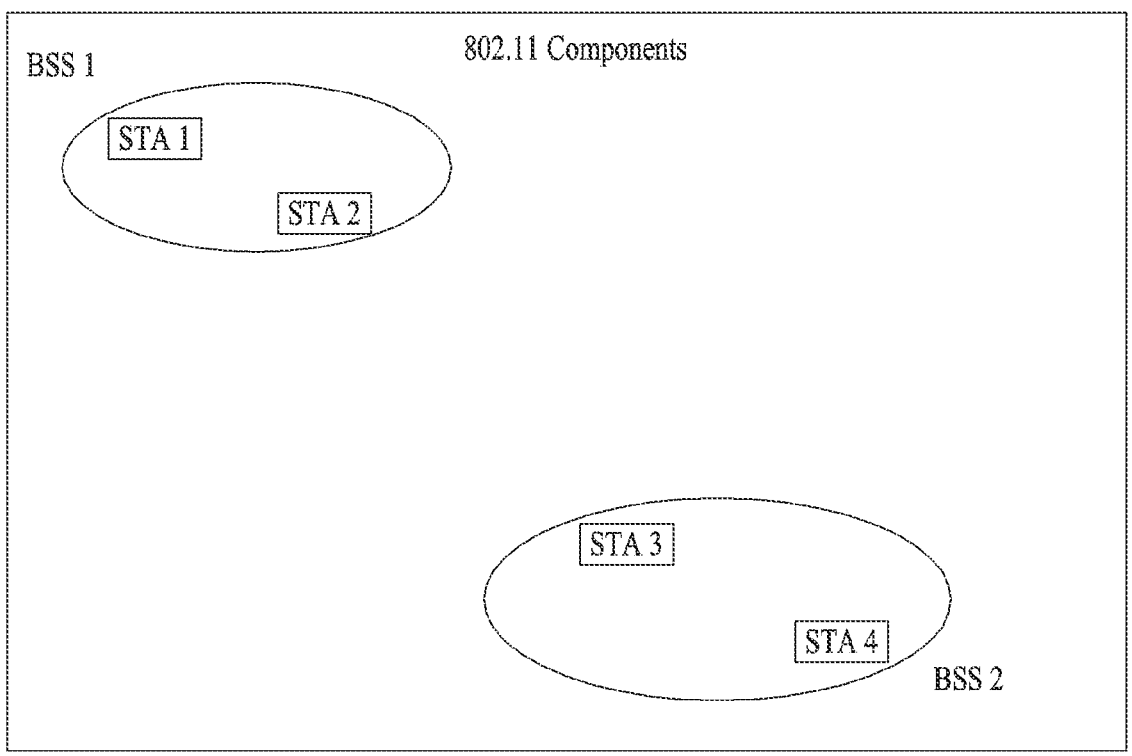
FIG. 1 illustrates a diagram for an example of a structure of IEEE 802.11 system to which the present invention is applicable.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting unclear, structures and/or devices known to the public are skipped or can be represented as block diagrams centering on the core functions of the structures and/or devices. Wherever possible, the same reference numbers will be used throughout the drawings to refer to the same or like parts.

Specific terminologies used for the following description may be provided to help the understanding of the present invention. And, the use of the specific terminology may be modified into other forms within the scope of the technical idea of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description mainly concerns IEEE 802.11 system, by which the technical features of the present invention may be non-limited.

FIG. 1 illustrates a diagram for an example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. FIG. 1 shows one example that two basic service sets (BSS 1 and BSS 2) exist and that 2 STAs are included as members of each BSS. In this case, an STA indicates a device operating according to MAC (medium access control)/PHY (physical) standard of IEEE 802.11. An STA includes an AP (access point) STA (simply, an AP) and a non-AP STA. An AP corresponds to a device providing network access (e.g., WLAN) to a non-AP STA via a wireless interface. The AP can be configured by a fixed form or a mobile form and includes a mobile wireless device (e.g., a laptop computer, a smartphone, etc.) providing a hot-spot. The AP corresponds to a base station (BS), a Node-B, an evolved Node-B (eNB), a base transceiver system (BTS), a femto BS and the like in a different wireless communication field. The non-AP STA corresponds to a device directly controlled by a user such as a laptop computer, a PDA, a wireless modem, a smartphone and the like. The non-AP STA can be called a terminal, a wireless transmit/receive unit (WTRU), a user equipment (UE), a mobile station (MS), a mobile terminal, a mobile subscriber station (MSS), and the like.

In FIG. 1, an oval indicating the BSS can be understood as indicating a coverage area in which the STAs included in the corresponding BSS maintain communications. This area may be named a basic service area (BSA). A BSS of a most basic type in IEEE 802.11 LAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBS S. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. This association may be dynamically configured or may include a use of a DSS (distribution system service).

Figure 2:
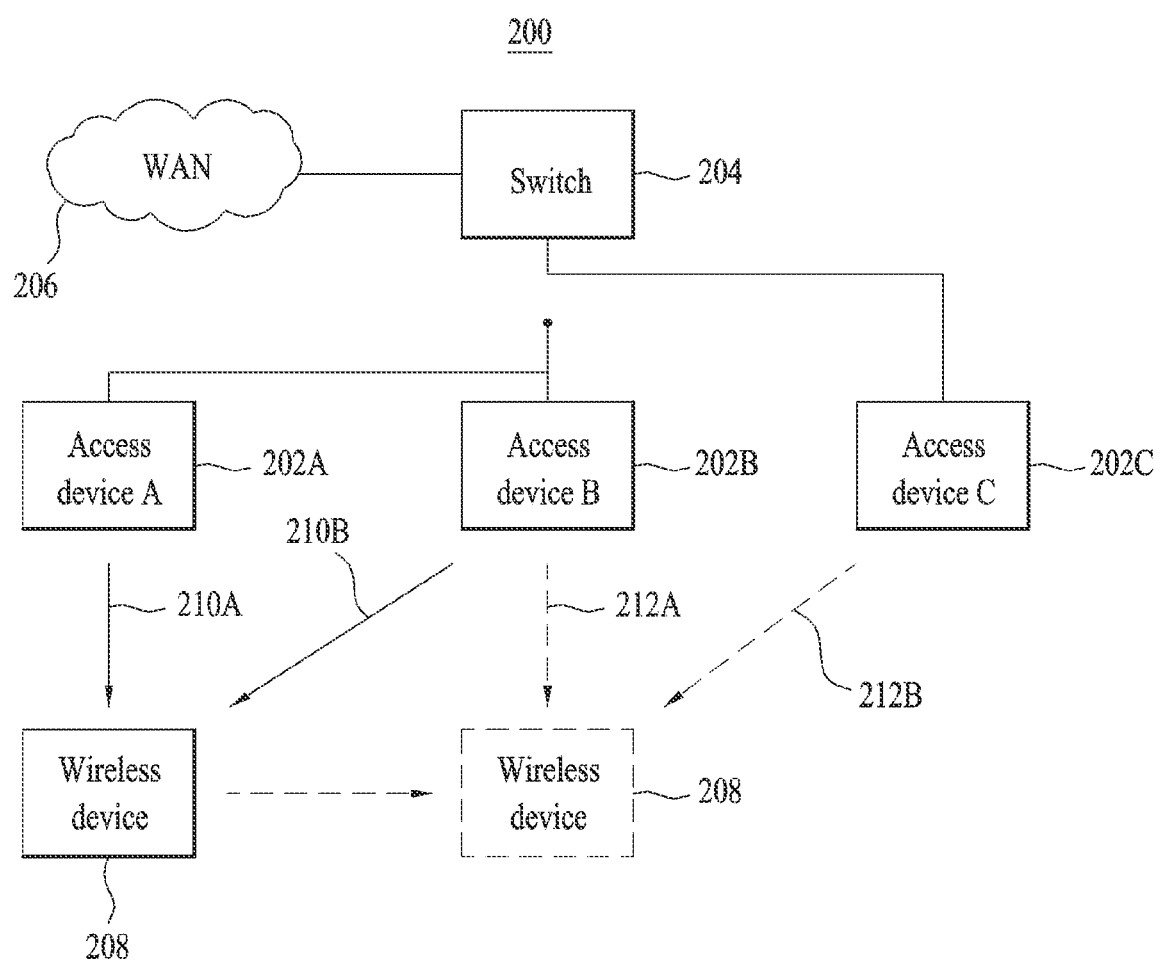
FIG. 2 is a block diagram for an example of operations of a communication system adopting access devices and wireless user devices.

FIG. 2 is a block diagram for an example of a communication system 200 adopting access devices (e.g., AP STAs) 220A/202B/202C and wireless user devices (e.g., non-AP STAs).

Referring to FIG. 2, access devices 202A to 202C are connected with a switch 204 providing access to a WAN (wide area network) 206 such as the Internet. Each of the access devices 202A to 202C provides wireless access to wireless devices belonging to a coverage area (not depicted) of the access device via a time division multiplexed network. Hence, the access devices 202A to 202C commonly provide a total WLAN coverage area of the system 200. For instance, a wireless device 208 may exist in a coverage area of the access devices 202A and 202B in a position represented by a box of a line. Hence, the wireless device 208 can receive beacons from each of the access devices 202A/202B as shown by line arrows 210A and 210B. If the wireless device 208 roams to a dotted line box from the line box, the wireless device 208 enters a coverage area of the access device 202C and leaves a coverage area of the access device 202A. Hence, as shown by dotted lines 212A and 212B, the wireless device 208 can receive beacons from the access devices 202B/202C.

When the wireless device 208 roams in the total WLAN coverage area provided by the system 200, the wireless device 208 can determine which device provides best access to the wireless device 208. For instance, the wireless device 208 repeatedly scans beacons of adjacent access devices and may be able to measure signal strength (e.g., power) related to each of the beacons. Hence, the wireless device 208 can be connected with an access device providing optimal network access based on maximum beacon signal strength. The wireless device 208 may be able to use a different reference related to optimal access. For instance, the optimal access may be associated with more preferable services (e.g., content, data rate and the like).

Figure 3:
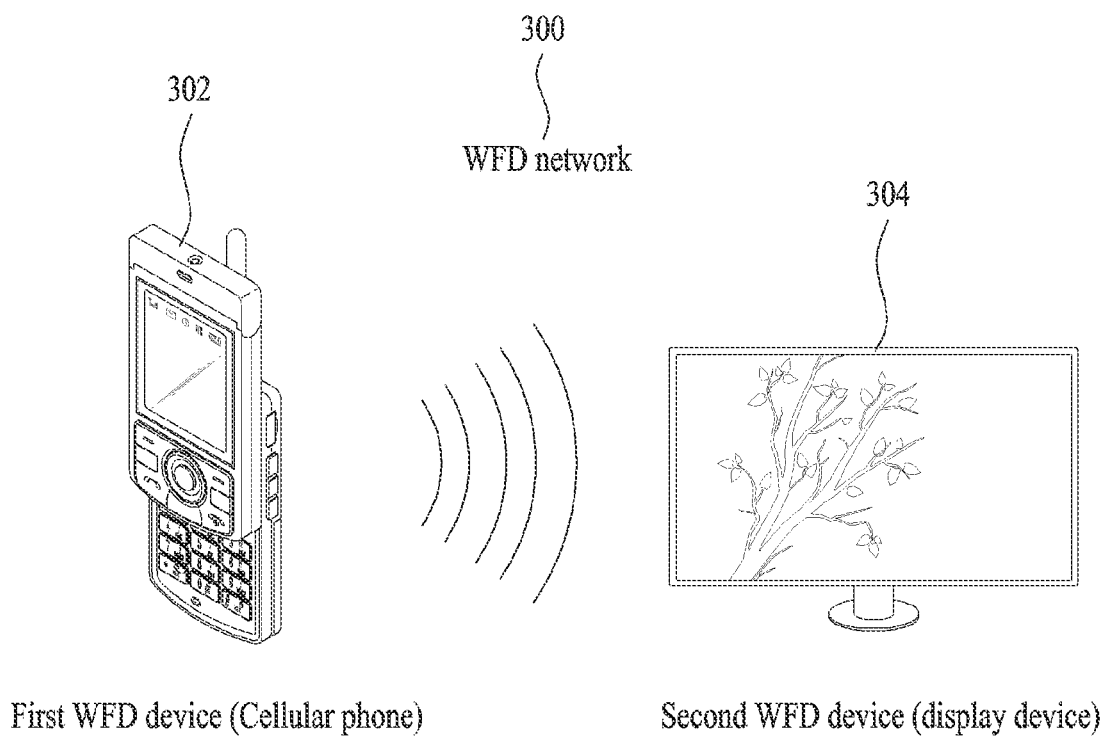
FIG. 3 illustrates a diagram showing an exemplary Wi-Fi Direct (WFD) network.

FIG. 3 illustrates a diagram showing an exemplary Wi-Fi Direct (WFD) network.

The Wi-Fi Direct network is a network that enables Wi-Fi devices to perform device-to-device (D2D) (or peer-to-peer (P2P)) communication even without association with a home network, office network and hot spot network, and has been suggested by Wi-Fi Alliance. Hereinafter, Wi-Fi Direct based communication will be referred to as Wi-Fi Direct D2D communication (simply D2D communication) or Wi-Fi Direct P2P communication (simply, P2P communication). Also, a device that performs Wi-Fi Direct P2P will be referred to as Wi-Fi Direct P2P device, simply referred to as P2P device or Peer device.

Referring to FIG. 3, the Wi-Fi Direct network (300 may include at least one Wi-Fi device that includes a first P2P device (302) and a second P2P device (304). The P2P device may include Wi-Fi supporting devices, for example, a display device, a printer, a digital camera, a projector, a smart phone, etc. In addition, the P2P device may include a non-AP STA and an AP STA. In this example, the first P2P device (302) is a smart phone, and the second P2P device (304) is a display device. The P2P devices of the Wi-Fi Direct network may directly be interconnected. In more detail, P2P communication may mean that a signal transmission path between two P2P devices is directly configured in the corresponding P2P devices without passing through a third device (e.g., AP) or a legacy network (e.g., a network accessed to WLAN through an AP). In this case, a signal transmission path directly configured between two P2P devices may be limited to a data transmission path. For example, P2P communication may mean that a plurality of non-STAs transmit data (e.g., voice, image, text information, etc.) without passing through the AP. A signal transmission path for control information (e.g., resource allocation information for P2P configuration, wireless device identification information, etc.) may directly be configured between P2P devices (e.g., non-AP STA to non-AP STA, non-AP STA to AP), may be configured between two P2P devices (e.g., non-AP to non-AP STA) through the AP, or may be configured between the AP and the corresponding P2P device (e.g., AP to non-AP STA #1, AP to non-AP STA #2).

Figure 4:
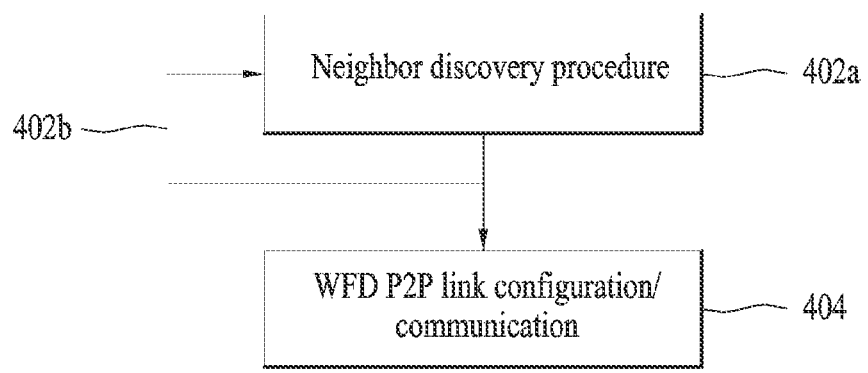
FIG. 4 illustrates a diagram showing a method for configuring a WFD network.

FIG. 4 illustrates a diagram showing a method for configuring a WFD network.

Referring to FIG. 4, the Wi-Fi Direct network setup procedure may be largely classified into two procedures. The first procedure is a neighbor discovery (ND) procedure (S402a), and the second procedure is a P2P link configuration and communication procedure (S404). Through the neighbor discovery procedure, the WFD device (e.g., 302 of FIG. 3) searches for another neighbor WFD device (e.g., 304 of FIG. 3) within (its own radio) coverage, and may obtain information required for association (e.g., pre-association) with the corresponding WFD device. In this case, the pre-association may mean a second layer pre-association in a radio protocol. For example, information required for the pre-association may include identification information of the neighbor WFD device. The neighbor discovery procedure may be carried out per available radio channel (S402b). Afterwards, the WFD device (302) may perform Wi-Fi Direct P2P link configuration/communication with another WFD device (304). For example, after the WFD device (302) is associated with a peripheral WFD device (304), the WFD device (302) may determine whether the corresponding WFD device (304) is a WFD device incapable of satisfying service requirements of a user. To this end, after the WFD device (302) is second layer pre-associated with the peripheral WFD device (304), the WFD device (302) may search for the corresponding WFD device (304). If the corresponding WFD device (304) does not satisfy service requirements of the user, the WFD device (302) may sever the second layer association configured for the corresponding WFD device (304), and may configure the second layer association with another WFD device. By contrast, if the corresponding WFD device (304) satisfies the service requirements of the user, the two WFD devices (302 and 304) may transmit and receive signals through a P2P link.

Figure 5:
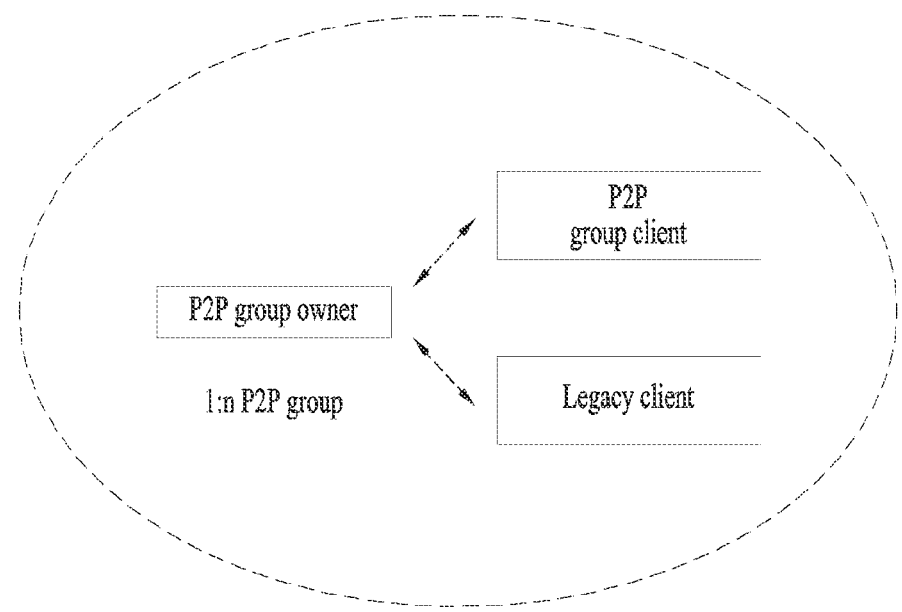
FIG. 5 is a diagram for a typical P2P network topology.

FIG. 5 is a diagram for a typical P2P network topology.

As shown in FIG. 5, a P2P GO can be directly connected with a client including a P2P function. Or, the P2P GO can be connected with a legacy client, which has no P2P function.

Figure 6:
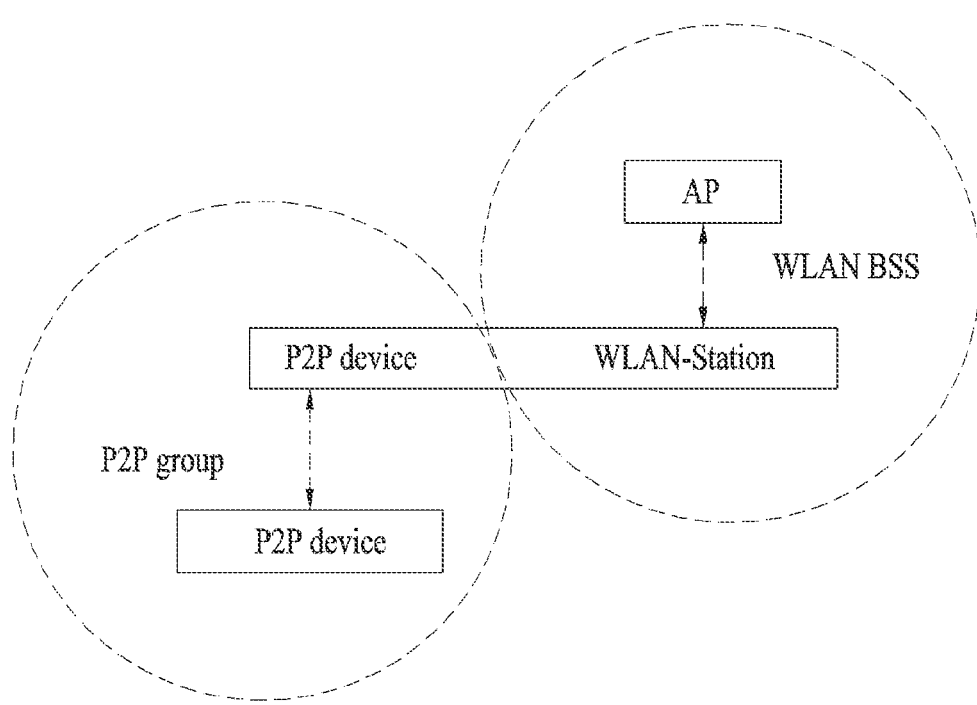
FIG. 6 is a diagram for a situation that a single P2P device forms a P2P group and is connected with an AP in a manner of operating as an STA of WLAN at the same time.

FIG. 6 is a diagram for a situation that a single P2P device forms a P2P group and is connected with an AP in a manner of operating as an STA of WLAN at the same time.

As shown in FIG. 6, according to P2P technical standard, a situation that a P2P device operates in the aforementioned mode is defined as a concurrent operation.

In order for a series of P2P devices to form a group, a P2P GO is determined based on a group owner intent value of a P2P attribute ID. The group owner intent value may have a value ranging from 0 to 15. P2P devices are exchanging the values and a P2P device including a highest value becomes the P2P GO. Meanwhile, in case of a legacy device not supporting the Wi-Fi P2P technology, although the legacy device can belong to a P2P group, a function of the legacy device is limited to a function of accessing an infrastructure network via the P2P GO.

According to Wi-Fi P2P standard, since a P2P GO transmits a beacon signal using OFDM (orthogonal frequency division multiplexing), a P2P device does not support 11b standard. Instead, 11a/g/n can be used as Wi-Fi P2P device.

In order to perform an operation of connecting a P2P GO and a P2P client with each other, a P2P standard mainly includes 4 functions described in the following.

First of all, P2P discovery is dealing with such a description entry as device discovery, service discovery, group formation and P2P invitation. According to the device discovery, 2 P2P devices exchange device-related information such as a device name of a counterpart device or a device type with each other via an identical channel. According to the service discovery, a service to be used and service-related information are exchanged with each other via P2P. According to the group formation, it corresponds to a function that a device to be a P2P GO is determined and a new group is formed. According to the P2P invitation, it corresponds to a function that a permanently formed P2P group is summoned or a function of making a P2P device join a legacy P2P group.

Secondly, P2P group operation explains P2P group formation and termination, connection to a P2P group, communication in a P2P group, a service for P2P client discovery, operation of a persistent P2P group and the like.

Thirdly, P2P power management is dealing with a method of managing power of a P2P device and a method of processing a signal on power saving mode timing.

Lastly, managed P2P device is dealing with a method of forming a P2P group in a single P2P device and a method of accessing an infrastructure network via a WLAN AP at the same time.

Characteristics of a P2P group are explained in the following. A P2P group is similar to a legacy infrastructure BSS (basic service set) in that a P2P GO plays a role of an AP and a P2P client plays a role of an STA. Hence, software capable of performing a role of a GO and a role of a client should be mounted on a P2P device. The P2P device is distinguished by using a P2P device address such as a MAC address. Yet, when the P2P device performs communication in a P2P group, the P2P device uses a P2P interface address. In this case, it is not necessary for the P2P device to use a single identifier (a globally unique ID) address. The P2P group includes a single identifier P2P group ID. The single identifier P2P group ID consists of a combination of an SSID (service set identifier) and a P2P device address. Wi-Fi P2P standard uses WPA2-PSK/AES for security. A life cycle of a P2P group has a temporary connection method and a persistent connection method for attempting an identical connection after prescribed time. In case of a persistent group, once a P2P group is formed, a role, a certificate, an SSID and a P2P group ID are cached. When connection is reestablished, connection of a group can be promptly established by applying an identical connection form.

In the following, Wi-Fi P2P connection method is explained. A Wi-Fi device mainly performs a connection procedure of two phases. First one corresponds to a phase that two P2P devices find out a counterpart device and a second one corresponds to a group formation phase for determining a role of a P2P GO or a role of a P2P client between discovered devices. First of all, the finding phase corresponds to a phase of connecting P2P devices with each other. In particular, the finding phase includes a search state and a listen state. The search state performs active search using a probe request frame. In this case, a range of the search is restricted for a quick search. For the quick search, such a social channel as a channel 1, 6 and 11 are used. A P2P device of the listen state maintains a reception state in a manner of selecting one channel from the 3 social channels. If the P2P device receives a probe request frame transmitted by a different P2P device of the search state, the P2P device transmits a probe response frame to the different P2P device in response to the probe request frame. P2P devices continuously repeat the search state and the listen state and may be able to arrive at a channel common to the P2P devices. The P2P devices find out a counterpart device and use a probe request frame and a probe response frame to selectively combine with the counterpart device and to discover a device type, a manufacturer, or a friendly device name. In order to check a service existing in the internal of the P2P devices and compatible between the devices, it may use the service discovery. The service discovery is used to determine whether a service provided in the internal of each device is compatible with a different device. According to the P2P standard, a specific service discovery standard is not designated. A user of a P2P device searches for a neighboring P2P device and a service provided by the P2P device and may be then able to connect with a device or a service preferred by the user.

As a second phase, a group formation phase is explained in the following. If a P2P device completes the aforementioned find phase, checking existence of a counterpart device is completed. Based on this, two P2P devices should enter a GO negotiation phase to configure a BSS. The negotiation phase is divided into two sub phases. One is a GO negotiation phase and another is a WPS (Wi-Fi protected setup) phase. In the GO negotiation phase, the two P2P devices negotiate a role of a P2P GO and a role of a P2P client with each other and an operation channel to be used in the internal of a P2P group is configured. In the WPS phase, such a usual job performed in a legacy WPS as exchanging PIN information inputted by a user using a keypad or the like, simple setup via a push button and the like is performed. In a P2P group, a P2P GO plays core role of the P2P group. The P2P GO assigns a P2P interface address, selects an operation channel of the group and transmits a beacon signal including various operation parameters of the group. In the P2P group, a beacon signal can be transmitted by the P2P GO only. A P2P device can quickly check the P2P GO using the beacon signal in a scan phase corresponding to a connection initial phase and performs a role of participating in the group. Or, the P2P GO can initiate a P2P group session by itself or may be able to initiate a session after the method mentioned earlier in the P2P finding phase is performed. Hence, since a value intended to be the P2P GO is controlled by an application or a higher layer service instead of a value fixed by a certain device, a developer can select an appropriate value, which is intended to be the P2P GO, according to a usage of each application program.

Subsequently, P2P addressing is explained in the following. A P2P device uses a P2P interface address in a manner of assigning a P2P interface address using a MAC address in a P2P group session. In this case, the P2P interface address of a P2P GO corresponds to a BSSID (BSS identifier). The BSSID practically corresponds to a MAC address of the P2P GO.

Connection release of a P2P group is explained in the following. If a P2P session is terminated, a P2P GO should inform all P2P clients of termination of a P2P group session via De-authentication. A P2P client can also inform the P2P GO of connection release. In this case, if possible, it is necessary to perform a disassociation procedure. Having received a connection release request of a client, the P2P GO can identify that connection of the P2P client is released. If the P2P GO detects a P2P client making a protocol error or performing an operation of interrupting connection of a P2P group, the P2P GO generates rejection of authentication or a denial of association. In this case, the P2P GO records a concrete failure reason on an association response and transmits the association response to the P2P client.

Figure 7:
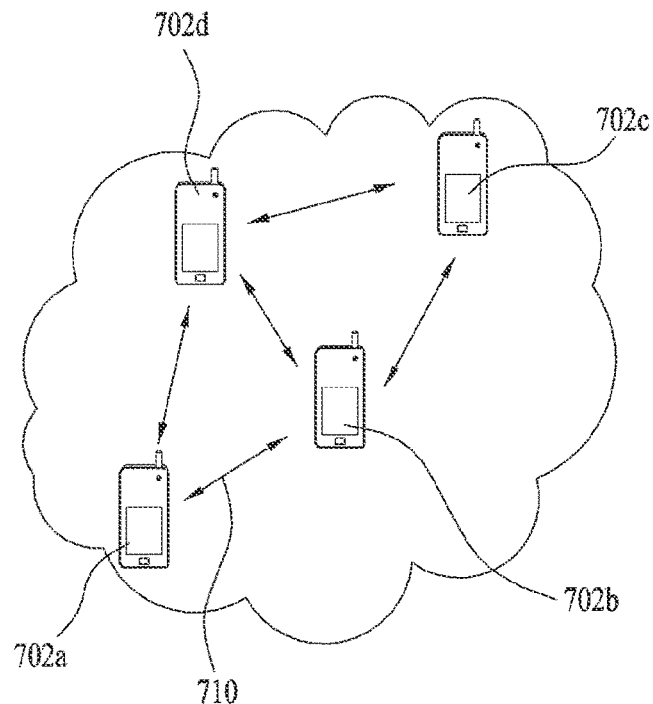
FIG. 7 is a diagram for a WFD network aspect in case that P2P is applied.

FIG. 7 is a diagram for a WFD network aspect in case that P2P is applied.

FIG. 7 shows an example of a WFD network aspect in case of applying a new P2P application (e.g., social chatting, location-based service provision, game interworking and the like). Referring to FIG. 7, a plurality of P2P devices 702a to 702d perform P2P communication 710 in a WFD network. P2P device(s) constructing the WFD network frequently change due to movement of the P2P device or the WFD network itself can be newly generated or disappeared dynamically/in a short time. Hence, characteristic of the new P2P application part is in that P2P communication can be performed and terminated dynamically/in a short time between a plurality of the P2P devices in dense network environment.

Figure 8:
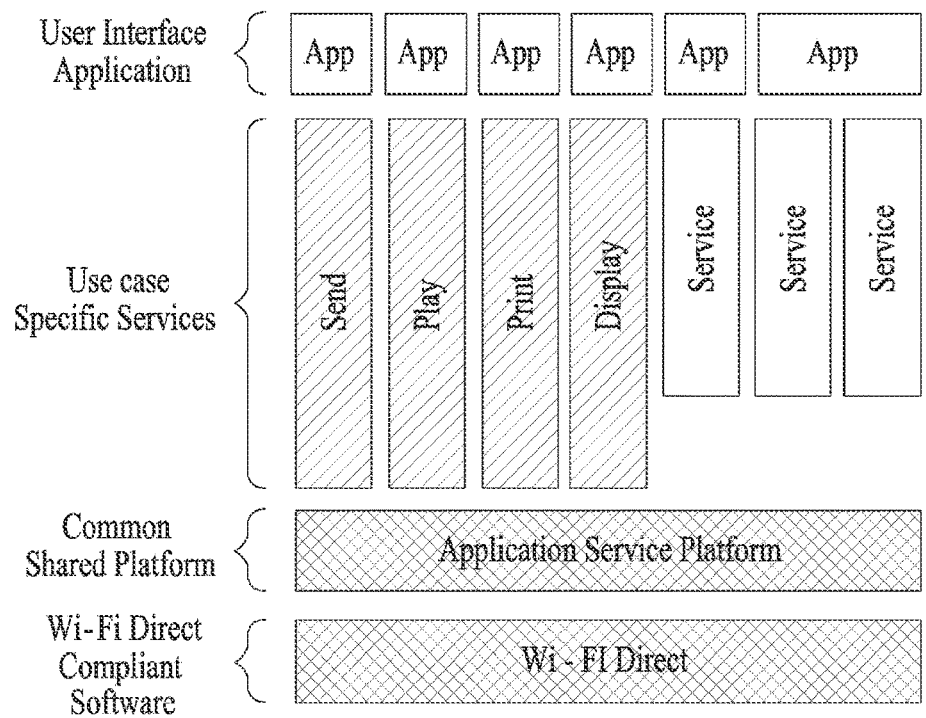
FIG. 8 is a simplified block diagram for a WFDS (Wi-Fi Direct services) device.

FIG. 8 is a simplified block diagram for a WFDS (Wi-Fi Direct services) device.

A platform for such an application service as an ASP (application service platform) is defined for a Wi-Fi Direct MAC layer and above. The ASP plays a role of session management, command processing of a service, control between ASPs and security between a higher application and a lower Wi-Fi Direct. 4 basic services including a Send service, a Play service, a Display service and a Print service defined by WFDS, a corresponding application and an UI (user interface) are supported at the top of the ASP. In this case, the Send service corresponds to a service capable of performing file transfer between two WFDS devices and an application therefor. The Play service corresponds to a streaming service capable of sharing A/V, a picture, and music based on a DLNA between two WFDS devices and an application therefor. The Print service defines a service capable of outputting a document and a picture between a device including content such as a document, a picture and the like and a printer and an application therefor. The Display service defines a service enabling screen sharing between Miracast source of WFA and Miracast sink and an application therefor. And, an enablement service is defined for the use of an ASP common platform in case of supporting a third party application except a basic service.

Among terminologies described in the present invention, such a terminology as a service hash is formed from a service name using a first 6 octets of a service hash algorithm (e.g., SHA256 hashing) of a service name. A service hash used by the present invention does not mean a specific service hash. Instead, it may be preferable to comprehend the service hash as a sufficient representation of a service name using a probe request/response discovery mechanism. As a simple example, if a service name corresponds to "org.wifi.example", 6 bytes of a forepart of a value of which the service name is hashed by the SHA256 corresponds to a hash value.

In WFDS, if a hash value is included in a probe request message and a service is matched with each other, it may be able to check whether the service is supported in a manner of responding by a probe response message including a service name. In particular, the service name corresponds to a name of a user readable service of a DNS form. A service hash value indicates upper 6 bytes among a value of 256 bytes of the service name generated by an algorithm (e.g., SHA256). As mentioned in the foregoing example, if a service name corresponds to "org.wifi.example", a service hash may correspond to a value of "4e-ce-7e-64-39-49".

Hence, a part of a value of which a service name is hashed by an algorithm is represented as a service hash (information) in the present invention. The service hash can be included in a message as information.

Method of Configuring Legacy WFDS

Figure 9:
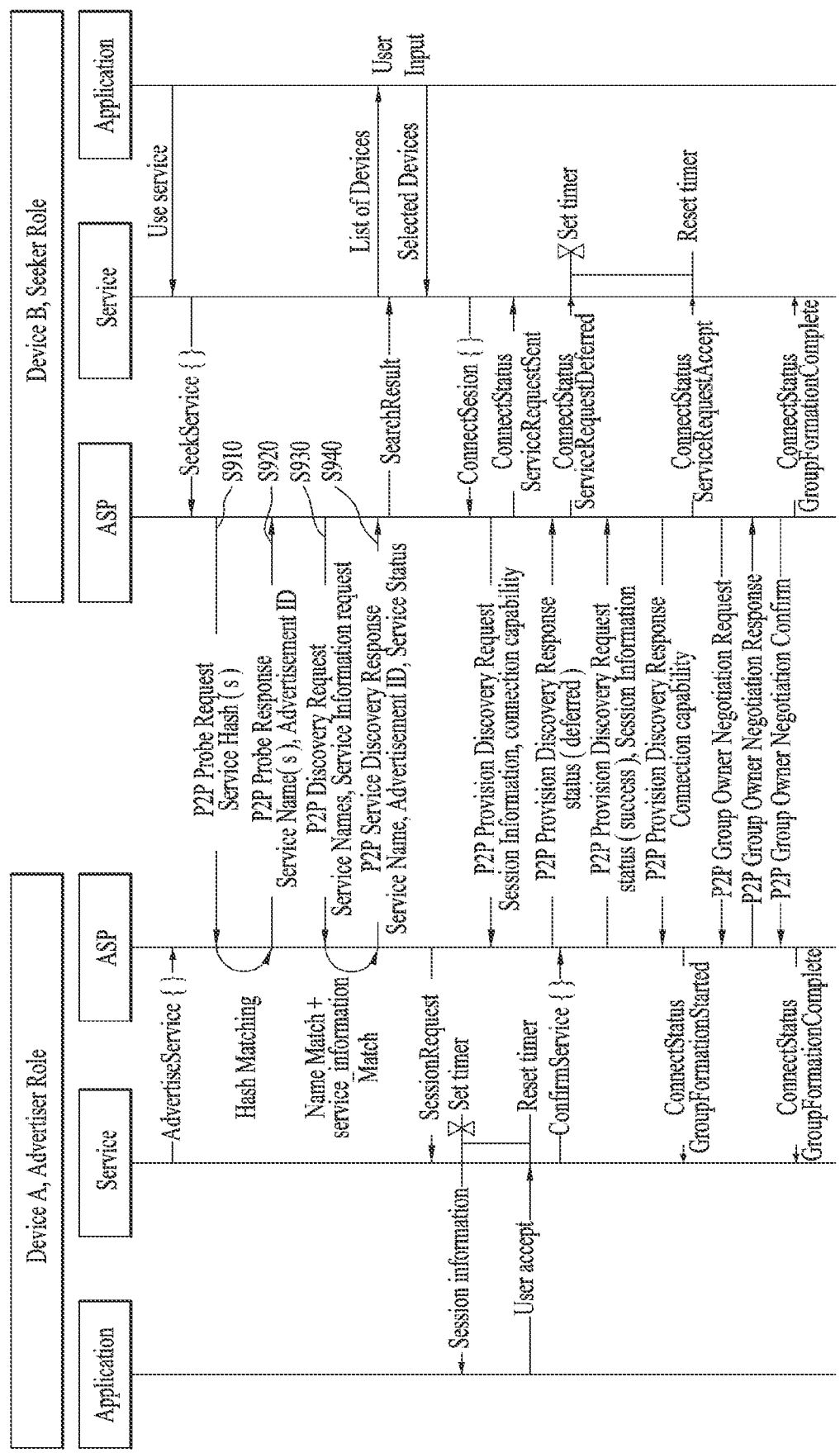
FIG. 9 is a flowchart for a process of establishing a WFDS session by discovering a device and a service between WFDS devices in a legacy WFDS.

FIG. 9 is a flowchart for a process of establishing a WFDS session by discovering a device and a service between WFDS devices in a legacy WFDS.

For clarity, as shown in FIG. 4, assume that a device A plays a role of an advertiser advertising a WFDS capable of being provided by the device A to a seeker and a device B plays a role in seeking an advertised service. The device A corresponds to a device intending to advertise a service of the device A and a counterpart device intends to start the service in a manner of finding out the service of the device A. The device B performs a procedure of finding out a device supporting a service according to a request of a higher application or a user.

A service end of the device A advertises a WFDS capable of being provided by the service end to an application service platform (ASP) end of the device A. A service end of the device B can also advertise a WFDS capable of being provided by the service end to an ASP end of the device B. In order for the device B to use a WFDS as a seeker, an application end of the device B indicates a service to be used to the service end and the service end indicates the ASP end to find out a target device to use the WFDS.

In order to find out the target device to use the WFDS, the ASP end of the device B transmits a P2P (peer to peer) probe request message [S910]. In this case, the P2P probe request message includes a service name, which is intended to be found out by the ASP end of the device B or is capable of being supported by the ASP end of the device B, in a service hash form in a manner of hashing the service name. Having received the P2P probe request message from the seeker, if the device A supports the corresponding service, the device A transmits a P2P probe response message to the device B in response to the P2P probe request message [S920]. The P2P probe response message includes a service supported by a service name or a hash value and a corresponding advertise ID value. This procedure corresponds to a device discovery procedure indicating that the device A and the device B are WFDS devices. It is able to know whether a service is supported via the device discovery procedure.

Subsequently, it is able to know a specific service in detail via a P2P service discovery procedure, optionally. The device B, which has found a device capable of performing a WFDS with the device B, transmits a P2P service discovery request message to the device [S930]. Having received the P2P service discovery request message from the device B, the ASP end of the device A transmits a P2P service discovery response message to the device B in a manner of matching the service advertised by the service end of the device A with a P2P service name and a P2P service information received from the device B with each other [S940]. In this case, a GAS protocol defined by IEEE 802.11u is used. As mentioned in the foregoing description, when a request for a service search is completed, the device B can inform an application and a user of a search result. At this point, a group of Wi-Fi Direct is not formed yet. If a user selects a service and the selected service performs a connect session, P2P group formation is performed.

The ASP may be operated based on at least one of Wi-Fi, Wi-Fi Direct, Neighbor Awareness Networking (NAN), Near Field Communication (NFC), or Bluetooth Low Energy (BLE). In this case, the Wi-Fi and the like may correspond to an interface. In particular, the interface may correspond to a method of supporting an operation of a terminal. In the following, a method for an ASP to interwork with a device/service discovery based on the interfaces is explained in detail.

In this case, for example, among the aforementioned interfaces, the BLE may correspond to a Bluetooth transmission/reception scheme in a form of using a frequency of 2.4 GHz and reducing power consumption. In particular, in order to quickly transmit and receive data of extremely small capacity, it may use the BLE to transmit data while reducing power consumption.

And, for example, the NAN (neighbor awareness networking) network may correspond to NAN terminals using a set of the same NAN parameters (e.g., a time period between continuous discovery windows, a period of a discovery window, a beacon interval, a NAN channel, etc.). The NAN terminals can configure a NAN cluster. In this case, the NAN cluster uses a set of the same NAN parameters and may correspond to a set of NAN terminals synchronized with the same window schedule. A NAN terminal belonging to the NAN cluster can directly transmit a multicast/unicast NAN service discovery frame to a different NAN terminal within a range of a discovery window.

And, for example, the NFC may operate on a relatively low frequency band such as 13.56 MHz. In this case, if two P2P devices support the NFC, it may optionally use an NFC channel. A seeker P2P device can discover a P2P device using the NFC channel. When an NFC device is discovered, it may indicate that two P2P devices agree on a common channel for forming a group and share provisioning information such as a password of a device.

A method of interworking via an ASP for the aforementioned interfaces is explained in detail in the following. In this case, although the abovementioned configurations are proposed as an interface capable of being interlocked with the ASP, this is an example only. It may support a different interface as well, by which the present invention may be non-limited.

Figure 10:
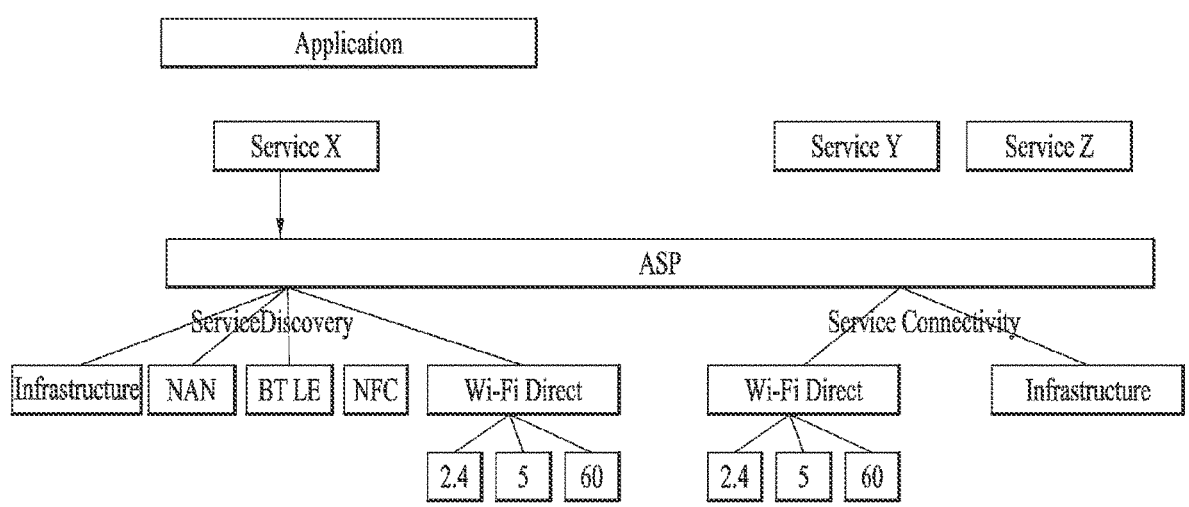
FIG. 10 is a diagram for an application service platform (ASP) supporting a plurality of interfaces.

FIG. 10 is a diagram for a service application platform (ASP) supporting a plurality of interfaces.

As mentioned in the foregoing description, a service end of an advertiser terminal corresponding to a terminal supporting WFDS advertises a service capable of being provided by the service end and a service end of a seeker terminal corresponding to a different terminal supporting the WFDS can indicate an ASP end to search for a target device for which the service is to be used. In particular, it may be able to support the WFDS between terminals via the ASP.

In this case, referring to FIG. 10, the ASP can support a plurality of interfaces. In this case, for example, the ASP can support a plurality of interfaces for performing service discovery. And, the ASP can support a plurality of interfaces for performing service connection.

In this case, for example, a plurality of the interfaces for performing the service discovery may correspond to at least one selected from the group consisting of Wi-Fi Direct, NAN (Neighbor Awareness Networking), NFC (Near Field Communication), BLE (Bluetooth Low Energy), and WLAN Infrastructure.

And, a plurality of the interfaces for performing the service connection may correspond to at least one selected from the group consisting of Wi-Pi Direct, P2P, and Infrastructure. And, for example, the ASP can support a plurality of frequency bands. In this case, for example, a plurality of the frequency bands may correspond to 2.4 GHz, 5 GHz, 60 GHz, and the like. And, for example, the ASP can support information on a frequency band less than 1 GHz. In particular, the ASP can support a plurality of frequency band and is not restricted to a specific frequency band.

Referring to FIG. 10, a first terminal can perform device discovery or service discovery on a first service using the ASP. Subsequently, if searching for the device discovery or the service discovery is completed, it may perform service connection based on a search result. In this case, for example, an interface used for performing the service discovery may be different from an interface used for performing the service connection. The interfaces can be selected from among a plurality of interfaces.

In this case, the ASP may use information or a parameter for supporting a plurality of the interfaces.

Regarding the ASP, for example, a service end of a terminal can obtain information on a service discovery method capable of supporting the first service and a connection method from the ASP. In this case, the first service may correspond to a service provided by the terminal and is not restricted to a specific service.

The service end of the terminal can call AdvertiseService( ) or SeekService( ) method to the ASP based on the information obtained from the ASP. In particular, similar to a legacy ASP operation, the terminal can use the ASP as an advertiser or a seeker to perform service discovery on the first service. After the service discovery is performed on the first service, the terminal can perform service connection based on a result of the service discovery. In this case, the service connection may correspond to a P2P or a WLAN infrastructure. In this case, for example, since both the service connections support a plurality of frequency bands, the service connection can be performed on the basis of a preferred band.

In this case, for one example, information on a service discovery method and connectivity method may be represented as Table 1.

TABLE 1

| Connectivity methods | P2P | Multiband information | 2.4, 5, 60 GHz | |
|---|---|---|---|---|
| | Infrastructure information | | BSSID | |
| | | Multiband information | 2.4, 5, 60 GHz | Channel Index per band |
| Service Discovery methods | | NAN | | |
| | | BTLE | | |
| | | NFC | | |
| | | Infrastructure | | |
| | P2P | Multiband information | 2.4, 5, 60 GHz | |

Figure 11:
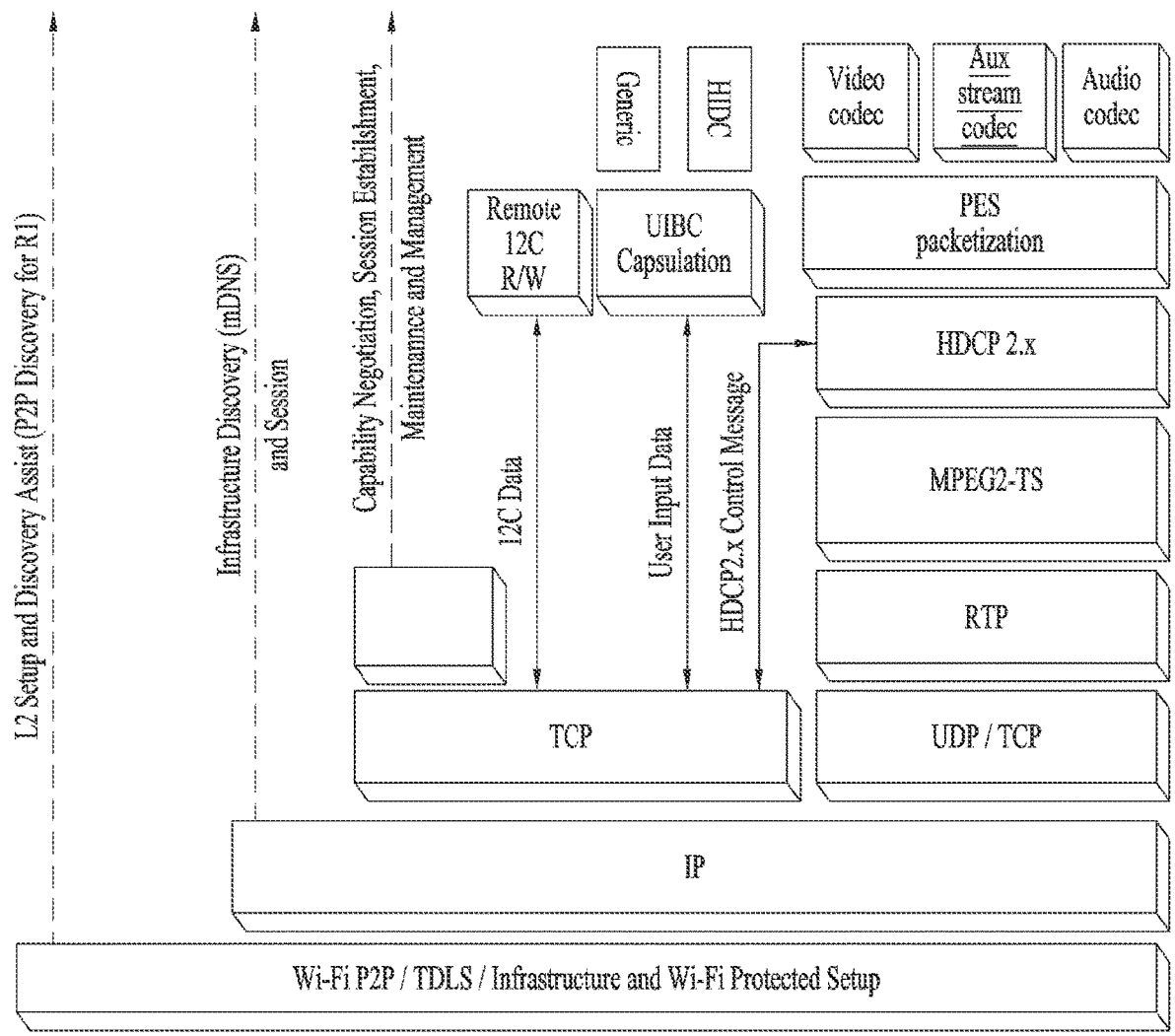
FIG. 11 is a diagram illustrating the structure of a data plane and a control plane in a WFD device.

FIG. 11 is a diagram illustrating the structure of a data plane and a control plane in a WFD device. Referring to FIG. 11, WFD devices may perform connectivity through any one of Wi-Fi Direct (Wi-Fi P2P), Tunneled Direct Link Setup (TDLS), and infrastructure. As an example, in a legacy system, the WFD devices may perform connectivity through either Wi-Fi Direct or TDLS. However, in a current system, the WFD devices may perform connectivity through any one of Wi-Fi Direct, TDLS, and infrastructure. As an example, the WFD devices may perform search and connectivity for a service based on the above-described ASP and the search and connectivity methods performed by the WFD devices are not limited to the above-described embodiment.

In addition, for example, the WFD devices may use Transmission Control Protocol (TCP) as a transport for exchanging control information in the control plane. Further, the WFD devices may use TCP or User Datagram Protocol (UDP) as a transport for exchanging data in the data plane. TCP and UDP may be transport layer protocols. As an example, TCP may check whether transmission has been successfully performed by receiving a response from a reception side. UDP may perform only transmission without receiving the response from the reception side. Therefore, TCP may be used in the control plane in which acknowledgement of reception of a counterpart is needed as control information and TCP or UDP may be used in the data plane as data information. In this case, since TCP should receive the response, transmission latency and overhead may increase although TCP may have high reliability of information transmission. On the other hand, although UDP may have low transmission latency or low overhead, UDP may have low reliability of information transmission. TCP and UDP may be used in consideration of characteristics of respective services in data transmission and a usage range of TCP and UDP is not limited to the above-described embodiment. Hereinbelow, a method of switching a UDP and/or TCP transport by a WFD device will be described. In addition, when a socket of the UDP and/or TCP transport in the WFD device is disconnected, a method of recovering the socket will be described.

Figure 12:
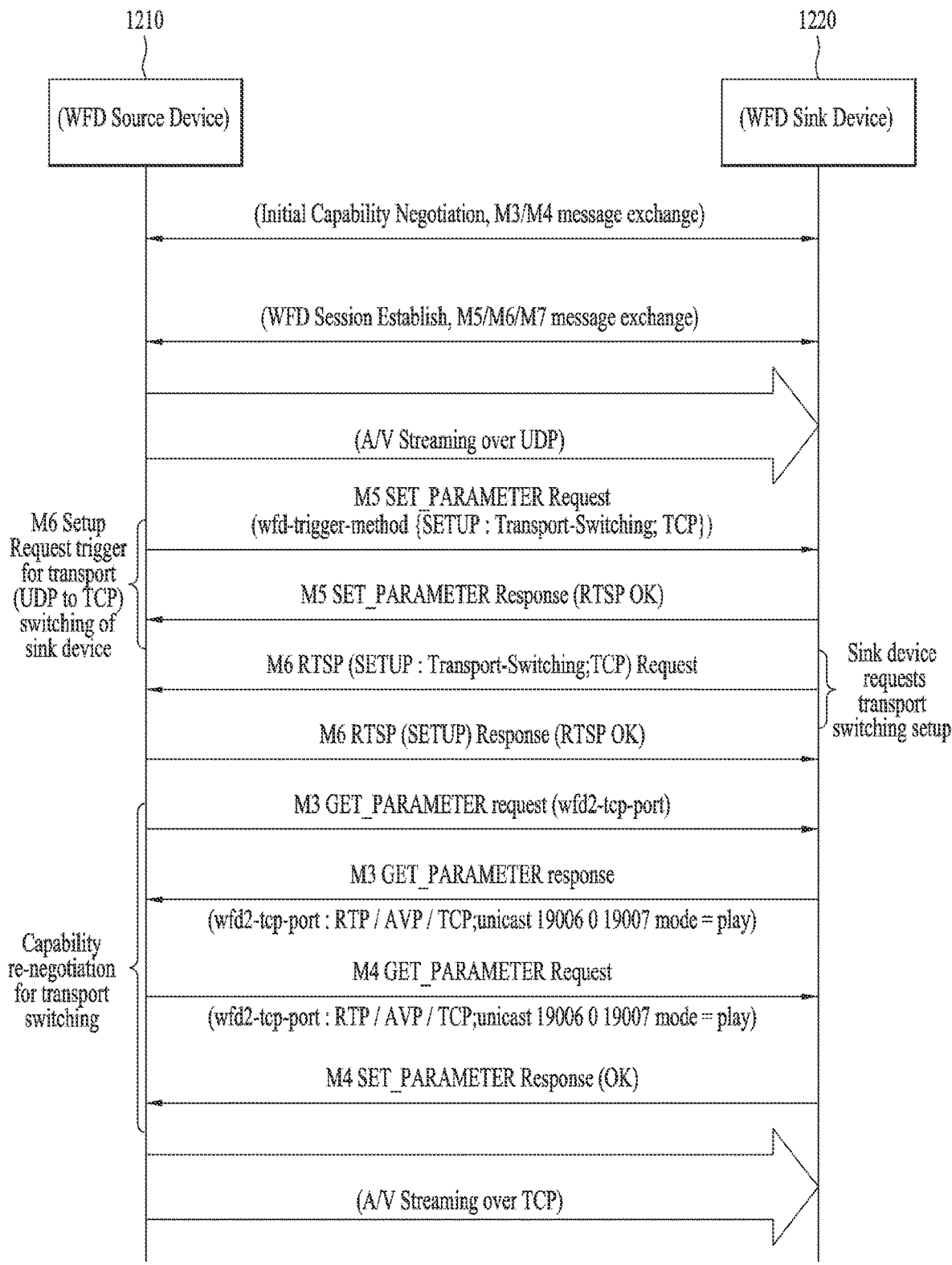
FIG. 12 is a diagram illustrating a transport switching method performed by a WFD sink device.

FIG. 12 is a diagram illustrating a transport switching method performed by a WFD sink device.

Referring to FIG. 12, a WFD source device 1210 may provide audio/video (A/V) streaming to a WFD sink device 1220. More specifically, the WFD source device 1210 and the WFD sink device 1220 may perform session establishment based on a Real-Time Streaming Protocol (RTSP) message. Next, the WFD source device 1210 may provide the A/V streaming over Real-time Transport Protocol (RTP) as real-time information.

When session establishment is performed, the WFD source device 1210 may transmit an RTSP M1 message to the WFD sink device 1220. The RTSP M1 message may be a message for requesting that an RTSP procedure be initiated. Next, the WFD sink device 1220 may transmit an RTSP M2 message to the WFD source device 1210. The RTSP M2 message may include information as to whether RTSP procedure initiation can be started and information about RTSP options.

Thereafter, the WFD source device 1210 and the WFD sink device 1220 may perform an RTSP M3 message and RTSP M4 message exchange procedure. Herein, the RTSP M3 message and RTSP M4 message exchange procedure may be a capability negotiation procedure of the WFD source device 1210 and the WFD sink device 1220. That is, the WFD source device 1210 and the WFD sink device 1220 may exchange information about capabilities thereof for session establishment by exchanging the RTSP M3 message and the RTSP M4 message. Next, the WFD source device 1210 and the sink device 1220 may perform WFD session establishment by exchanging an RTSP M5 message, an RTSP M6 message, and an RTSP M7 message. For example, session establishment initiation for the WFD source device 1210 and the WFD sink device 1220 may be performed based on the RTSP M5 message. Next, the WFD source device 1210 and the WFD sink device 1220 may exchange information about session establishment through the RTSP M6 message and the RTSP M7 message and perform session establishment for providing streaming. In this case, the about-described UDP or TCP may be used as a transport. That is, if the WFD source device 1210 provides A/V streaming to the WFD sink device 1220, the WFD source device 1210 and the WFD sink device 1220 may use UDP or TCP. As an example, if the WFD source device 1210 provides the A/V streaming over UDP, the WFD source device 1210 may request that the transport be switched from UDP to TCP. Alternatively, if the WFD source device 1210 provides the A/V streaming over TCP, the WFD source device 1210 may request that the transport be switched from TCP to UDP.

It is noted that the WFD sink device 1220, as well as the WFD source device 1210 that provides the A/V streaming as real-time data, may request transport switching. As an example, when a socket of a transport used by the WFD sink device 1220 is disconnected, there may be a necessity for the WFD sink device 1220 to request that the WFD source device 1210 switch the transport.

As an example, referring to FIG. 12, the WFD source device 1210 may provide the A/V streaming as real-time information to the WFD sink device 1220 over UDP. In this case, for example, the WFD sink device 1220 may desire to switch the transport from UDP to TCP.

In this case, the WFD source device 1210 may transmit the RTSP M5 message to the WFD sink device 1220 to trigger the RTSP M6 message for switching the transport of the WFD sink device 1220. Specifically, the RTSP M5 message may be a message for triggering session establishment as described above. For example, the RTSP M5 message may include a parameter "wfd-trigger-method". The parameter "wfd-trigger-method" may indicate that it is necessary to transmit the RTSP M6 message for session establishment to the WFD sink device 1220. In addition, for example, a setup configuration of the parameter "wfd-trigger-method" may be "setup: Transport-Switching;TCP" indicating information about transport switching. Next, the WFD sink device 1220 may transmit a response message to the WFD source device 1210 as the RTSP M5 message In this case, the RTSP M5 message that the WFD sink device 1220 transmits may include a parameter indicating information about whether to permit a request for transmission of the RTSP M6 message. As an example, the WFD sink device 1220 may transmit the RTSP M5 message including, as the parameter, a response "not ok" indicating that the request for transmission of the RTSP M6 message caused by the RTSP M5 message is not permitted to the WFD source device 1210. In this case, the RTSP M6 message is not transmitted. If transport switching is needed, the WFD source device 1210 may directly perform an operation for transport switching. That is, the WFD source device 1210 may separately perform a procedure for transport switching as a transport switching entity. If the WFD source device 1210 performs transport switching as the transport switching entity, the WFD source device 1210 may transmit information about transport switching in the RTSP M4 message to the WFD sink device 1220 and receive a response to the RTSP M4 message, thereby performing transport switching.

Meanwhile, the RTSP M5 message that the WFD sink device 1220 transmits may include, as the parameter, a response "RTSP ok" indicating that the request for transmission of the RTSP M6 message caused by the RTSP M5 message is permitted. Herein, after transmitting the response, the WFD sink device 1220 may transmit the RTSP M6 message to request that the WFD source device 1210 perform transport switching. As an example, the RTSP M6 message includes, as the parameter, "M6 setup request" indicating information about transport switching. For example, FIG. 12 is based on the case of transport switching from UDP to TCP and "Transport-Switching; TCP" may be included as the parameter. Next, the WFD source device 1210 may transmit a response message as the RTSP M6 message.

As an example, in the case in which the transport is switched, the WFD source device 1210 and the WFD sink device 1220 need to again perform the capability negotiation procedure through the RTSP M3 message and the RTSP M4 message. The WFD source device 1210 may transmit information about "wfd2-tcp-port" in the RTSP M3 message as the parameter. Next, the WFD sink device 1220 may transmit a response to the RTSP M3 message to the WFD source device 1210. The WFD source device 1210 and the WFD sink device 1220 may perform transport switching by exchanging the RTSP M4 message and the WFD source device 1210 may provide real-time data over the switched transport. For example, while the case in which transport switching from UDP to TCP is illustrated in FIG. 12, the same principle may be applied even to the case in which transport switching from TCP to UDP is performed.

When the transport is disconnected, the WFD source device 1210 may transmit the RTSP M5 message to the WFD sink device 1220 as a trigger message as described above. Herein, if the WFD source device 1210 recognizes that the transport is disconnected, the WFD source device 1210 may transmit a data packet for transport connection to the WFD sink device 1220 using the same transport before transmitting the RTSP M5 message to the WFD sink device 1220. If the transport is bound again based on the data packet that the WFD source device 1210 has transmitted, the transport may be maintained. However, if bind for the transport fails, the WFD source device 1210 may trigger transmission of the RTSP M6 message by transmitting the RTSP M5 message, which is the same as described above.

Figure 13:
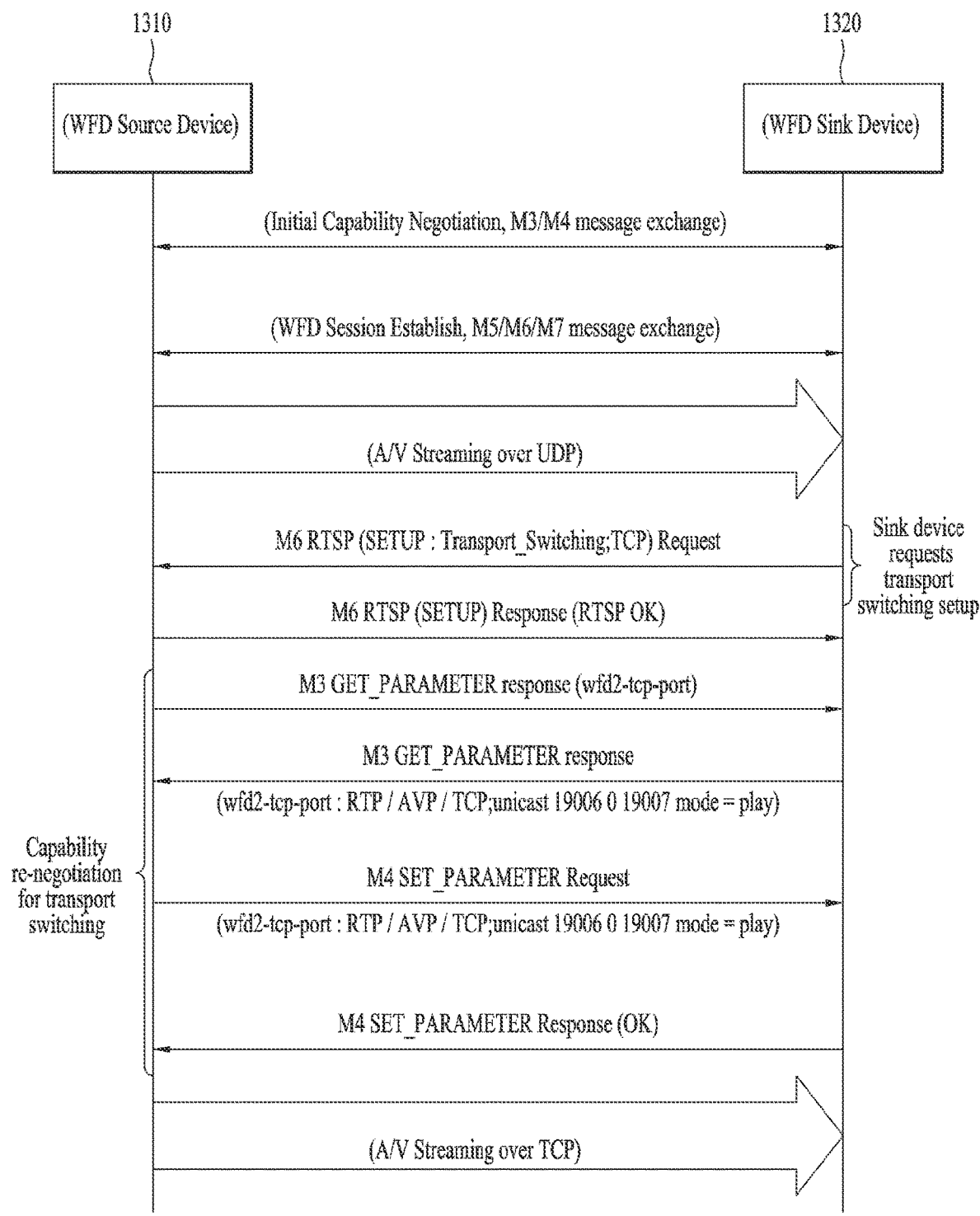
FIG. 13 is a diagram illustrating a transport switching method performed by a WFD sink device.

FIG. 13 is a diagram illustrating a transport switching method performed by a WFD sink device.

Referring to FIG. 13, a WFD source device 1310 may perform a capability negotiation procedure with a WFD sink device 1320 through an RTSP M3 message and an RTSP M4 message. The WFD source device 1310 and WFD sink device 1320 may perform session establishment through an RTSP M5 message, an RTSP M6 message, and an RTSP M7 message. Next, the WFD source device 1310 may provide A/V streaming to the WFD sink device 1320 as real-time data and this is identically performed as described with reference to FIG. 12.

Herein, the WFD sink device 1320 may desire to switch the transport. For example, if a socket is disconnected in the WFD sink device 1320, the WFD sink device 1320 may autonomously perform transport switching and this may be identically performed as described above.

Notably, referring to FIG. 13, the WFD sink device 1320 may transmit the RTSP M6 message to the WFD source device 1310. That is, even if the WFD sink device 1320 does not receive the RTSP M5 message as a trigger message, the WFD sink device 1320 may directly transmit the RTSP M6 message to the WFD source device 1310. For example, if transport switching is performed from UDP to TCP, "setup: Transport-Switching;TCP" may be configured as a parameter setup configuration of the RTSP M6 message that the WFD sink device 1320 transmits.

When transport switching is performed from TCP to UDP, "setup: Transport-Switching;UDP" may be configured as the parameter setup configuration of an RTSP M6 request message that the WFD sink device 1320 transmits. The WFD source device 1310 may transmit an RTSP M6 response message to the WFD sink device 1320 as a response to the RTSP M6 request message received from the WFD sink device 1320. In this case, "setup: RTSP OK" may be configured as a parameter setup configuration of the RTSP M6 response message.

In the case in which the transport is switched, the WFD source device 1310 and the WFD sink device 1320 need to again perform the capability negotiation procedure through the RTSP M3 message and the RTSP M4 message. The WFD source device 1310 may transmit information about "wfd2-tcp-port" in the RTSP M3 message as a parameter. Next, the WFD sink device 1320 may transmit a response to the RTSP M3 message to the WFD source device 1310. Next, the WFD source device 1310 and the WFD sink device 1320 may perform transport switching by exchanging the RTSP M4 message and the WFD source device 1310 may provide real-time data through the switched transport. For example, while the case in which transport switching from UDP to TCP is illustrated in FIG. 13, the same principle may be applied even to the case in which transport switching from TCP to UDP is performed.

Figure 14:
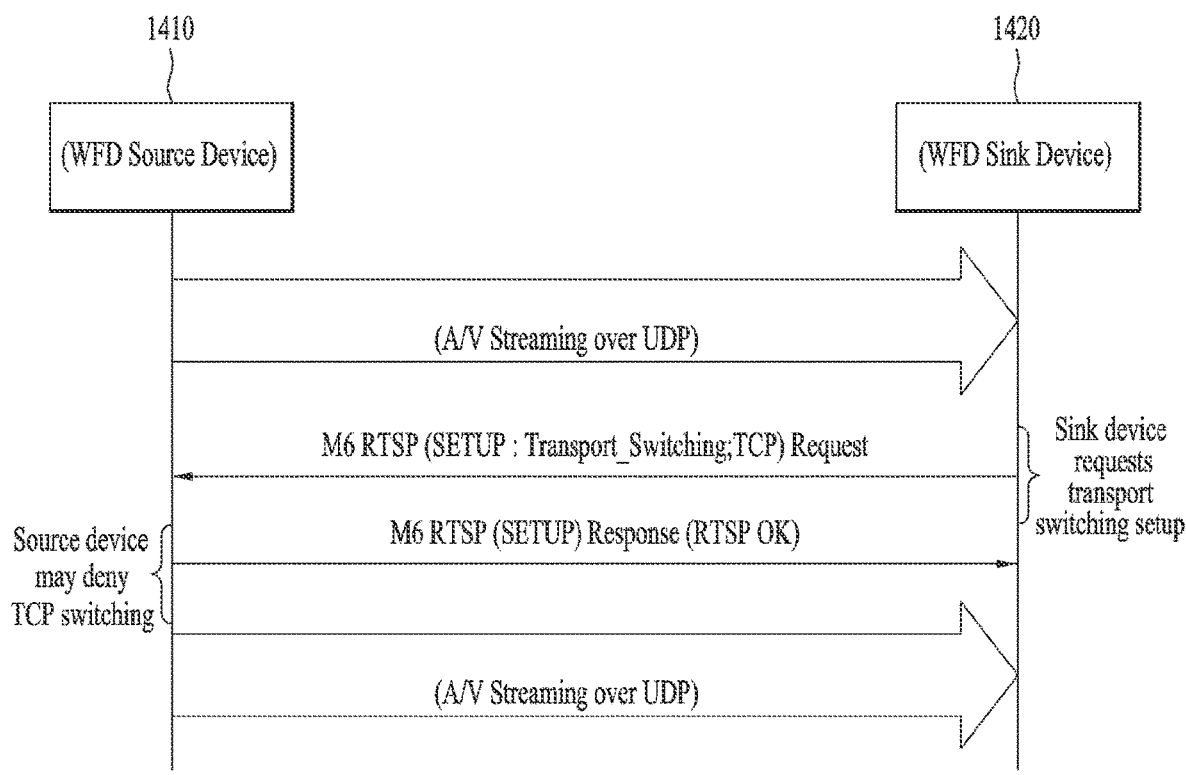
FIG. 14 is a diagram illustrating a transport switching permission method performed by a WFD source device.

FIG. 14 is a diagram illustrating a transport switching permission method performed by a WFD source device.

Referring to FIG. 14, a WFD sink device 1420 may transmit an RTSP M6 request message to a WFD source device 1410, for transport switching. The WFD source device 1410 may transmit an RTSP M6 response message to the WFD sink device 1420 as a response to the RTSP M6 request message received from the WFD sink device 1420, which is the same as described above.

Herein, the WFD source device 1410 may transmit information as to whether to permit transport switching in the RTSP M6 response message. For example, if a socket of a transport of the WFD source device 1410 to be switched has been disconnected, the WFD source device 1410 may not permit transport switching. For other reasons, the WFD source device 1410 may not permit transport switching and the case in which the WFD source device does not permit transport switching is not limited to the above-described embodiment.

If the WFD source device 1410 permits transport switching, "setup: RTSP OK" may be configured as a parameter setup configuration of the RTSP M6 response message. If the parameter setup configuration of the received RTSP M6 response message indicates "setup: RTSP OK", the WFD sink device 1410 may perform transport switching. If the WFD source device 1410 does not permit transport switching, the parameter setup configuration of the RTSP M6 response message may indicate "setup: not OK". If the parameter setup configuration of the received RTSP M6 response message indicates "setup: not OK", the WFD sink device 1420 cannot perform transport switching. Then, the WFD source device 1420 may provide real-time data over an existing transport. For example, if it is impossible to perform transport switching, the WFD source device 1420 may perform a transport recovery procedure which will be described later.

Figure 15:
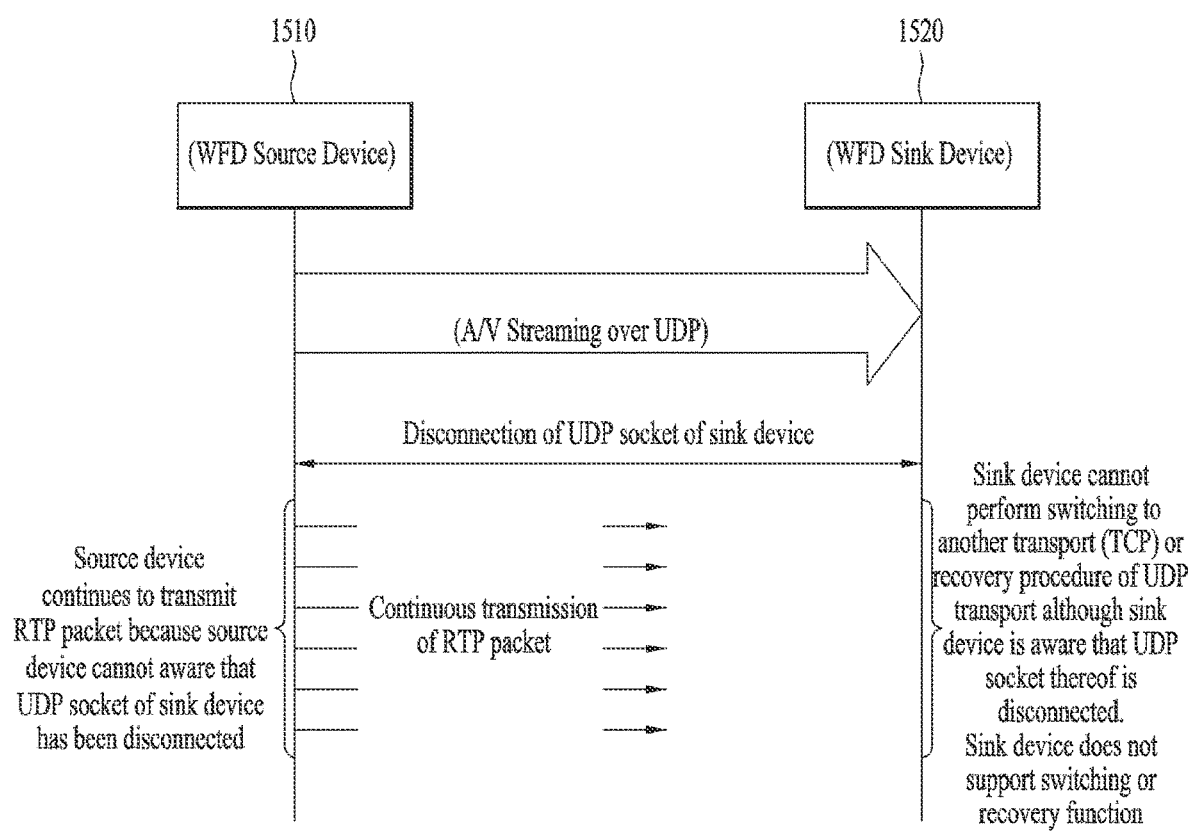
FIG. 15 is a diagram illustrating in detail a situation in which transport switching is needed.

FIG. 15 is a diagram illustrating in detail a situation in which transport switching is needed.

Referring to FIG. 15, a WFD source device 1510 may provide A/V streaming to a WFD sink device 1520 as real-time data. In this case, the WFD source device 1510 may provide the A/V streaming to the WFD sink device over UDP.

For example, a UDP socket of the WFD sink device 1520 may be disconnected. The UDP socket of the WFD sink device 1520 may be a socket or transport for receiving the above-described A/V streaming based on RTP. That is, the transport of the WFD sink device 1520 may be an unavailable state. In this case, since the WFD source device 1510 is not aware that the UDP socket of the WFD sink device has been disconnected, the WFD source device 1510 may continue to transmit an RTP packet. Accordingly, in the above situation, it is necessary for the WFD sink device 1520 to perform transport switching or recover the transport.

FIGS. 16 to 23 illustrate detailed embodiments for transport switching or transport recovery. In this case, a transport socket of the sink device or the source device may be disconnected. Different methods may be applied to respective cases.

Figure 16:
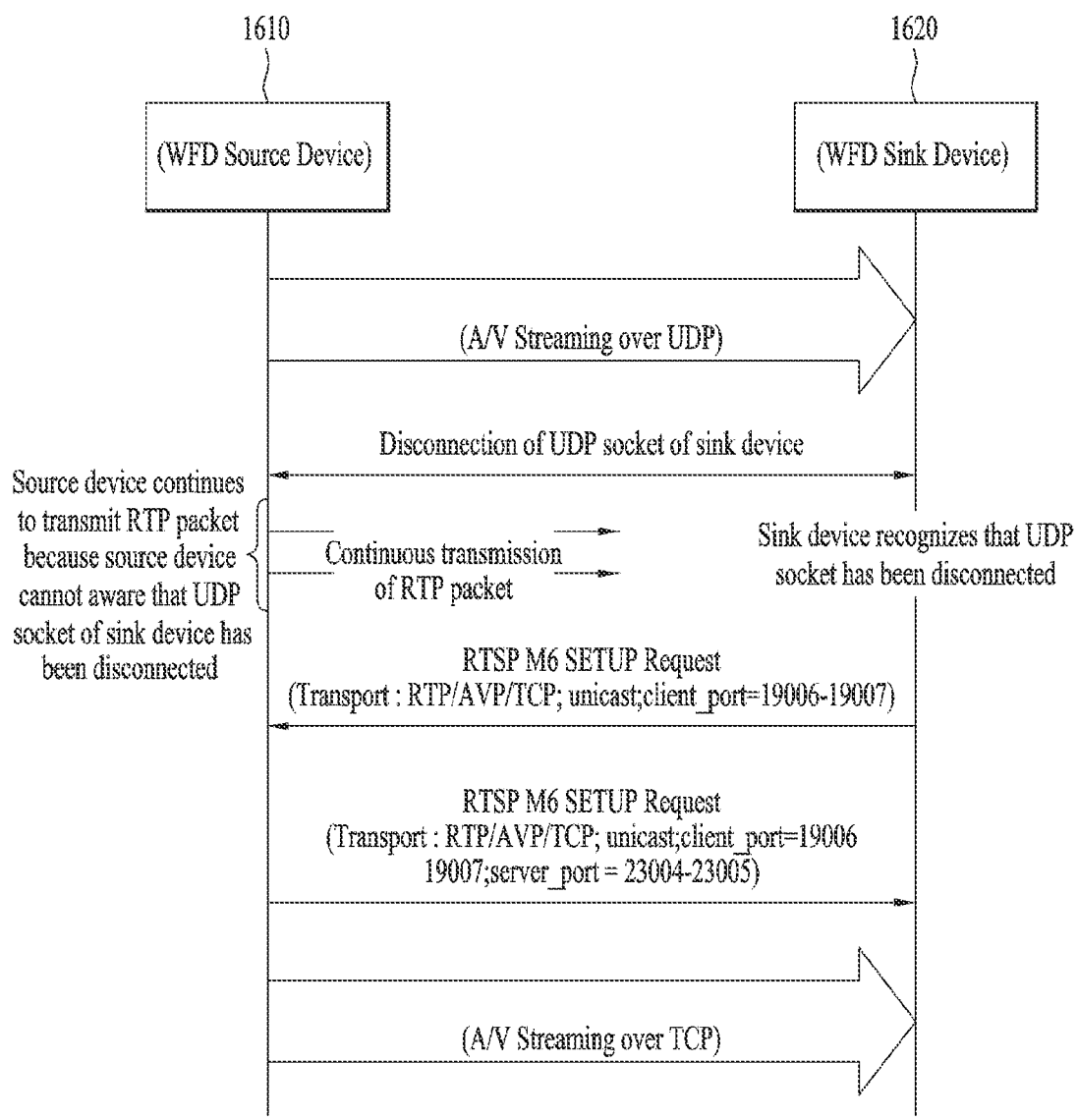
FIG. 16 is a diagram illustrating a transport switching method when a UDP socket of a WFD sink device is disconnected.

FIG. 16 is a diagram illustrating a transport switching method when a UDP socket of a WFD sink device is disconnected.

Referring to FIG. 16, a WFD source device 1610 may provide A/V streaming to a WFD sink device 1620 over UDP. In this case, a UDP socket of the WFD sink device 1620 may be disconnected. The WFD source device 1610 cannot recognize that the UDP socket of the WFD sink device 1620 has been disconnected and may continue to transmit an RTP packet.

For example, the WFD sink device 1620 may recognize that the UDP socket has been disconnected and perform a procedure for transport switching to TCP. Switching to TCP may be identical to the above description given with respect to FIGS. 11 to 14. Herein, information (or parameters) included in an RTSP M6 request message (or RTSP M6 setup request message) that the WFD sink device 1620 transmits will now be described in detail. For example, the RTSP M6 request message may include client port information for TCP. The client port information may include RTP port information and RTP Control Protocol (RTCP) port information. That is, the WFD sink device 1620 may include the client port information desired to be used as a TCP client in the RTSP M6 request message. The RTSP M6 request message may include information about an A/V streaming method or type and the information included in the RTSP M6 request message is not limited to the above-described embodiment. In addition, the RTSP M6 request message may include information indicating that the message is for switching to TCP. That is, the RTSP M6 request message may include indication information about switching to TCP.

Thereafter, the WFD source device 1610 may transmit an RTSP M6 response message (or RTSP M6 setup response message) to the WFD sink device 1620 as a response to the RTSP M6 request message. The RTSP M6 response message may include client port information and server port information. The server port information may include RTP port information and RTCP port information. That is, the RTSP M6 response message may include port information about the WFD source device 1610 serving as a TCP server. Next, the WFD source device 1610 and the WFD sink device 1620 may switch the transport from UDP to TCP. The WFD source device 1610 may provide the A/V streaming to the WFD sink device 1620 over the switched TCP.

Figure 17:
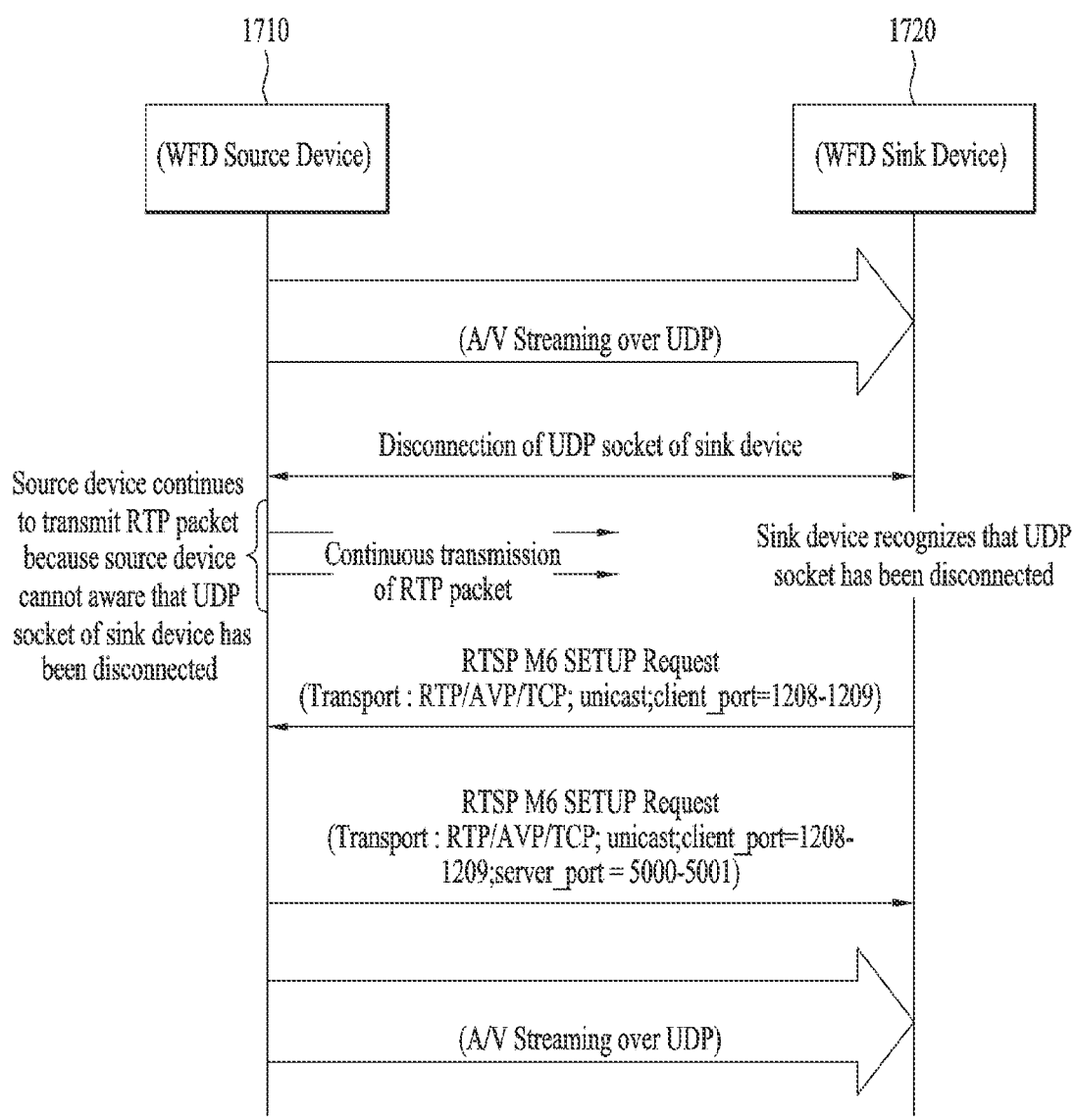
FIG. 17 is a diagram illustrating a transport recovery method when a UDP socket of a WFD sink device is disconnected.

FIG. 17 is a diagram illustrating a transport recovery method when a UDP socket of a WFD sink device is disconnected.

Referring to FIG. 17, a WFD source device 1710 may provide A/V streaming to a WFD sink device 1720 over UDP. In this case, a UDP socket of the WFD sink device 1720 may be disconnected. The WFD source device 1710 cannot recognize that the UDP socket of the WFD sink device 1720 has been disconnected and may continue to transmit an RTP packet.

For example, the WFD sink device 1720 may recognize that the UDP socket has been disconnected and perform a procedure for transport recovery. As an example, the WFD sink device 1720 may use an RTSP M6 request message (or RTSP M6 setup request message) to recover UDP. The RTSP M6 request message may include client port information for UDP. The client port information may include RTP port information and RTCP port information. That is, the WFD sink device 1720 may include the client port information desired to be used as a UDP client in the RTSP M6 request message. The RTSP M6 request message may include information about an A/V streaming method or type and the information included in the RTSP M6 request message is not limited to the above-described embodiment. In addition, the RTSP M6 request message may include information indicating that the message is for UDP recovery. That is, the RTSP M6 request message may include indication information about UDP recovery.

Thereafter, the WFD source device 1710 may transmit an RTSP M6 response message (or RTSP M6 setup response message) to the WFD sink device 1720 as a response to the RTSP M6 request message. The RTSP M6 response message may include client port information and server port information. The server port information may include RTP port and RTCP port information. That is, the RTSP M6 response message may include port information about the WFD source device 1710 serving as a UDP server. Next, the WFD source device 1710 and the WFD sink device 1720 may recover UDP. The WFD source device 1710 may provide the A/V streaming to the WFD sink device 1720 over UDP.

Figure 18:
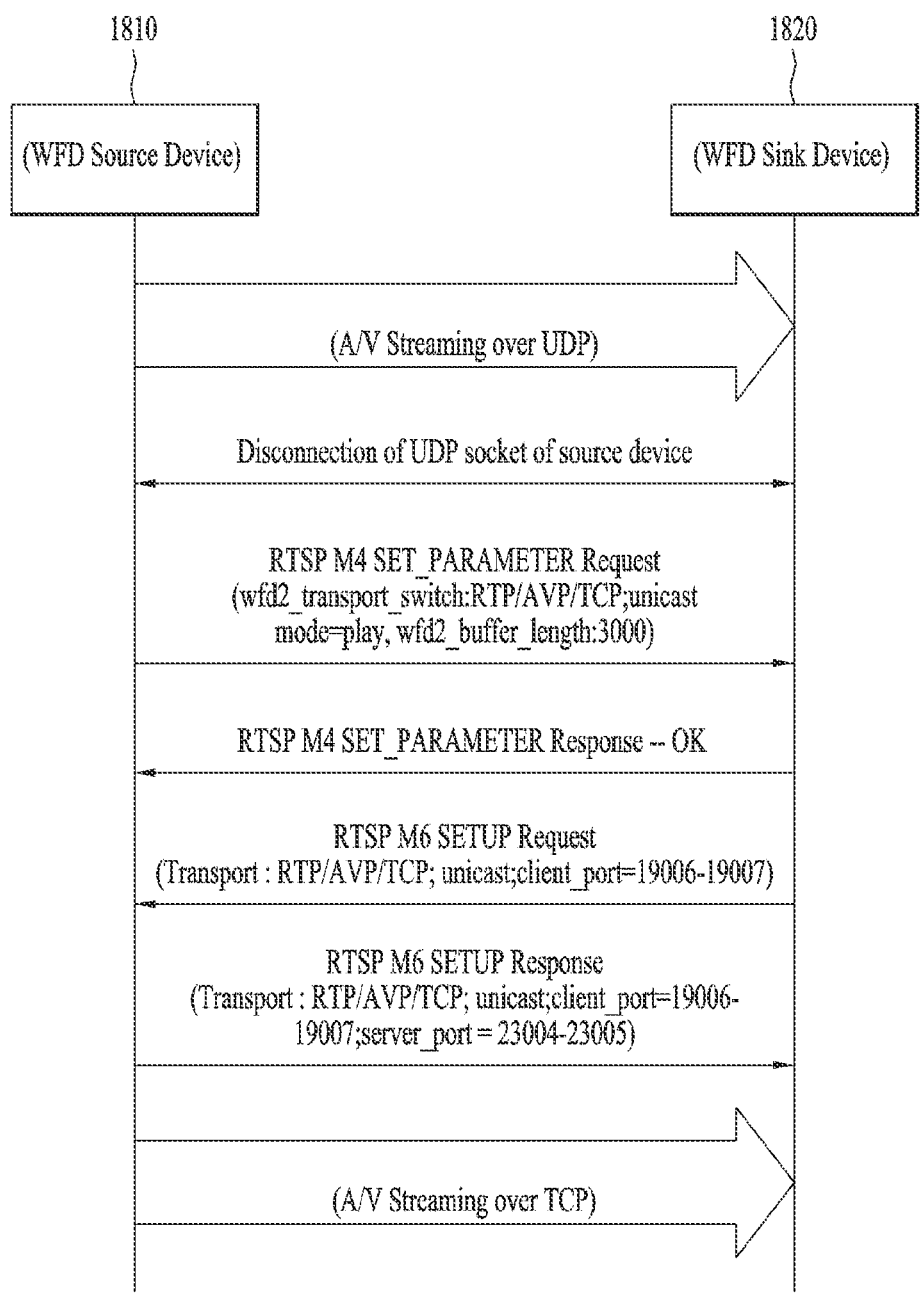
FIG. 18 is a diagram illustrating a transport switching method when a UDP socket of a WFD source device is disconnected.

FIG. 18 is a diagram illustrating a transport switching method when a UDP socket of a WFD source device is disconnected.

Referring to FIG. 18, a WFD source device 1810 may provide A/V streaming to a WFD sink device 1820 over UDP. In this case, a UDP socket of the WFD source device 1810 may be disconnected. The WFD source device 1810 may recognize that a socket thereof has been disconnected and autonomously perform a procedure for transport switching to TCP.

For example, the WFD source device 1810 may transmit an RTSP M4 request message (or RTSP M4 set_parameter request message) to the WFD sink device 1820 for transport switching to TCP. Herein, the RTSP M4 request message may include information indicating transport switching. Next, the WFD sink device 1820 may transmit an RTSP M4 response message (or RTSP M4 set_parameter response message) to the WFD source device 1810. For example, the RTSP M4 response message may include information as to whether to permit switching, which is the same as described above.

Next, the WFD sink device 1820 may transmit an RTSP M6 request message (or RTSP M6 setup request message) to the WFD source device 1810. The RTSP M6 request message may include client port information for TCP. The client port information may include RTP port information and RTCP port information. That is, the WFD sink device 1820 may include the client port information desired to be used as a TCP client in the RTSP M6 request message. The RTSP M6 request message may include information about an A/V streaming method or type and the information included in the RTSP M6 request message is not limited to the above-described embodiment. In addition, the RTSP M6 request message may include information indicating that the message is for switching to TCP. That is, the RTSP M6 request message may include indication information about switching to TCP.

Thereafter, the WFD source device 1810 may transmit an RTSP M6 response message (or RTSP M6 setup response message) to the WFD sink device 1820 as a response to the RTSP M6 request message. The RTSP M6 response message may include client port information and server port information. The server port information may include RTP port information and RTCP port information. That is, the RTSP M6 response message may include port information about the WFD source device 1810 serving as a TCP server. Next, the WFD source device 1810 and the WFD sink device 1820 may switch the transport from UDP to TCP. The WFD source device 1810 may provide the A/V streaming to the WFD sink device 1820 over the switched TCP.

Figure 19:
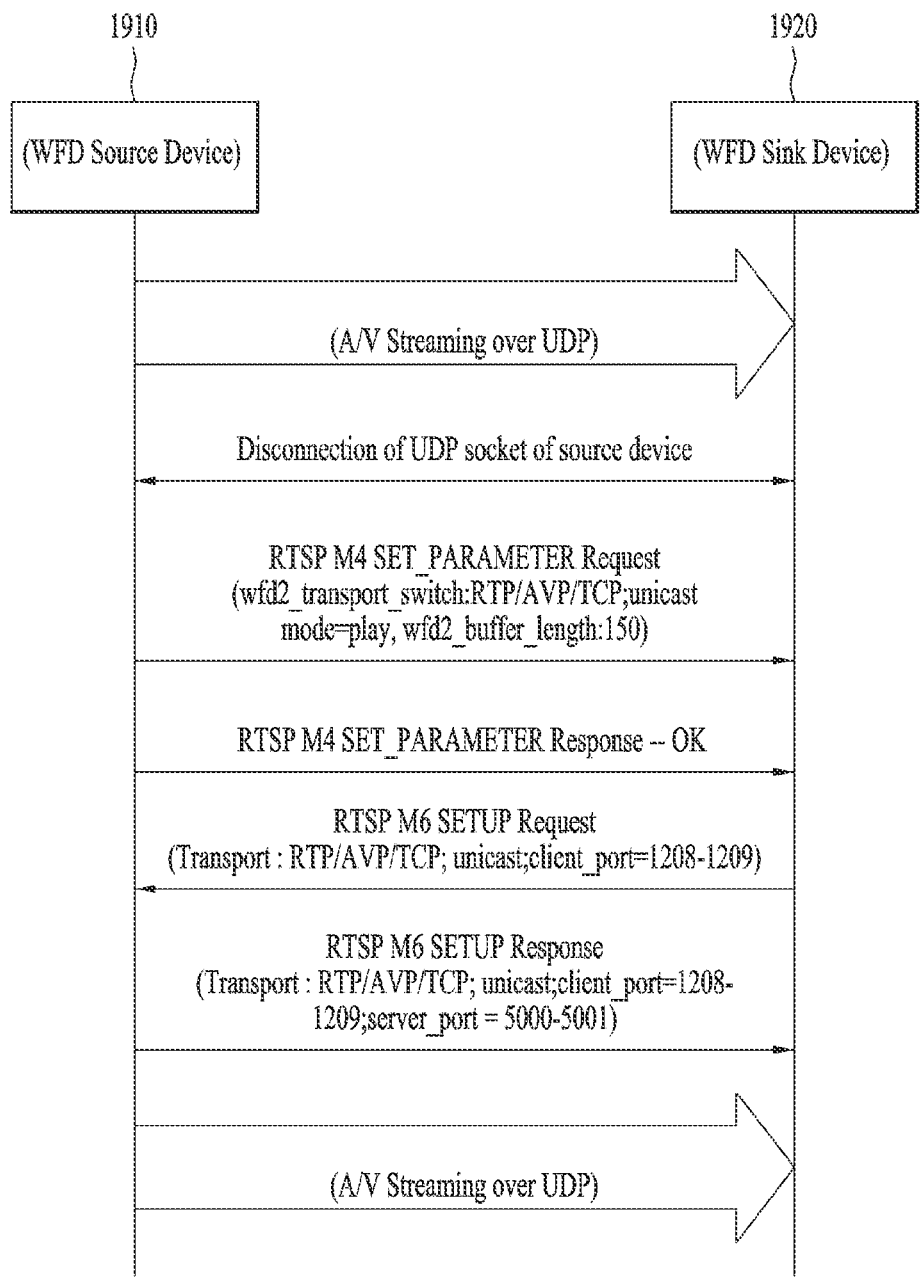
FIG. 19 is a diagram illustrating a transport recovery method when a UDP socket of a WFD source device is disconnected.

FIG. 19 is a diagram illustrating a transport recovery method when a UDP socket of a WFD source device is disconnected.

Referring to FIG. 19, a WFD source device 1910 may provide A/V streaming to a WFD sink device 1920 over UDP. In this case, a UDP socket of the WFD source device 1910 may be disconnected. The WFD source device 1910 may recognize that a socket thereof has been disconnected and autonomously perform a procedure for UDP recovery.

For example, the WFD source device 1910 may transmit an RTSP M4 request message (or RTSP M4 set_parameter request message) to the WFD sink device 1920 for recovering UDP. Herein, the RTSP M4 request message may include information indicating transport recovery. Next, the WFD sink device 1920 may transmit an RTSP M4 response message (or RTSP M4 set_parameter response message) to the WFD source device 1910. For example, the RTSP M4 response message may include information as to whether to permit transport recovery, which is the same as described above.

Next, the WFD sink device 1920 may transmit an RTSP M6 request message (or RTSP M6 setup request message) to the WFD source device 1910. The RTSP M6 request message may include client port information for UDP. The client port information may include RTP port information and RTCP port information. That is, the WFD sink device 1920 may include the client port information desired to be used as a UDP client in the RTSP M6 request message. The RTSP M6 request message may include information about an A/V streaming method or type and the information included in the RTSP M6 request message is not limited to the above-described embodiment. In addition, the RTSP M6 request message may include information indicating that the message is for UDP recovery. That is, the RTSP M6 request message may include indication information about UDP recovery.

Thereafter, the WFD source device 1910 may transmit an RTSP M6 response message (or RTSP M6 setup response message) to the WFD sink device 1920 as a response to the RTSP M6 request message. The RTSP M6 response message may include client port information and server port information. The server port information may include RTP port information and RTCP port information. That is, the RTSP M6 response message may include port information about the WFD source device 1910 serving as a UDP server. Next, the WFD source device 1910 and the WFD sink device 1920 may recover UDP. The WFD source device 1910 may provide the A/V streaming to the WFD sink device 1920 over UDP.

Figure 20:
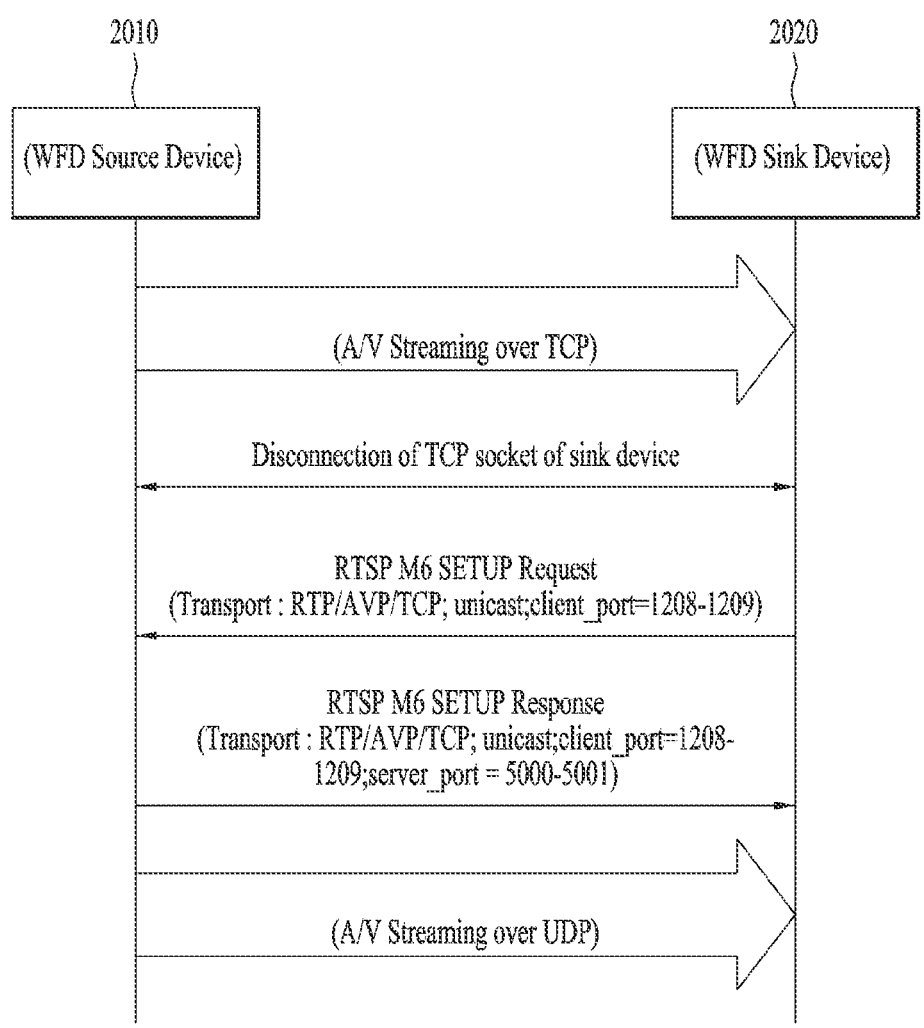
FIG. 20 is a diagram illustrating a transport switching method when a TCP socket of a WFD sink device is disconnected.

FIG. 20 is a diagram illustrating a transport switching method when a TCP socket of a WFD sink device is disconnected.

Referring to FIG. 20, a WFD source device 2010 may provide A/V streaming to a WFD sink device 2020 over TCP. In this case, a TCP socket of the WFD sink device 2020 may be disconnected. The WFD source device 2020 may autonomously perform a procedure for transport switching.

For example, the WFD sink device 2020 may recognize that the TCP socket has been disconnected and perform a procedure for transport switching to UDP. Switching to UDP may be identical to the above description given with respect to FIGS. 11 to 14. Herein, information (or parameters) included in an RTSP M6 request message (or RTSP M6 setup request message) that the WFD sink device 202020 transmits will now be described in detail. For example, the RTSP M6 request message may include client port information for UDP. The client port information may include RTP port information and RTCP port information. That is, the WFD sink device 2020 may include the client port information desired to be used as a UDP client in the RTSP M6 request message. The RTSP M6 request message may include information about an A/V streaming method or type and the information included in the RTSP M6 request message is not limited to the above-described embodiment. In addition, the RTSP M6 request message may include information indicating that the message is for switching to UDP. That is, the RTSP M6 request message may include indication information about switching to UDP.

Thereafter, the WFD source device 2010 may transmit an RTSP M6 response message (or RTSP M6 setup response message) to the WFD sink device 2020 as a response to the RTSP M6 request message. The RTSP M6 response message may include client port information and server port information. The server port information may include RTP port information and RTCP port information. That is, the RTSP M6 response message may include port information about the WFD source device 2010 serving as a UDP server. Next, the WFD source device 2010 and the WFD sink device 2020 may switch the transport from TCP to UDP. The WFD source device 2010 may provide the A/V streaming to the WFD sink device 2020 over the switched UDP.

Figure 21:
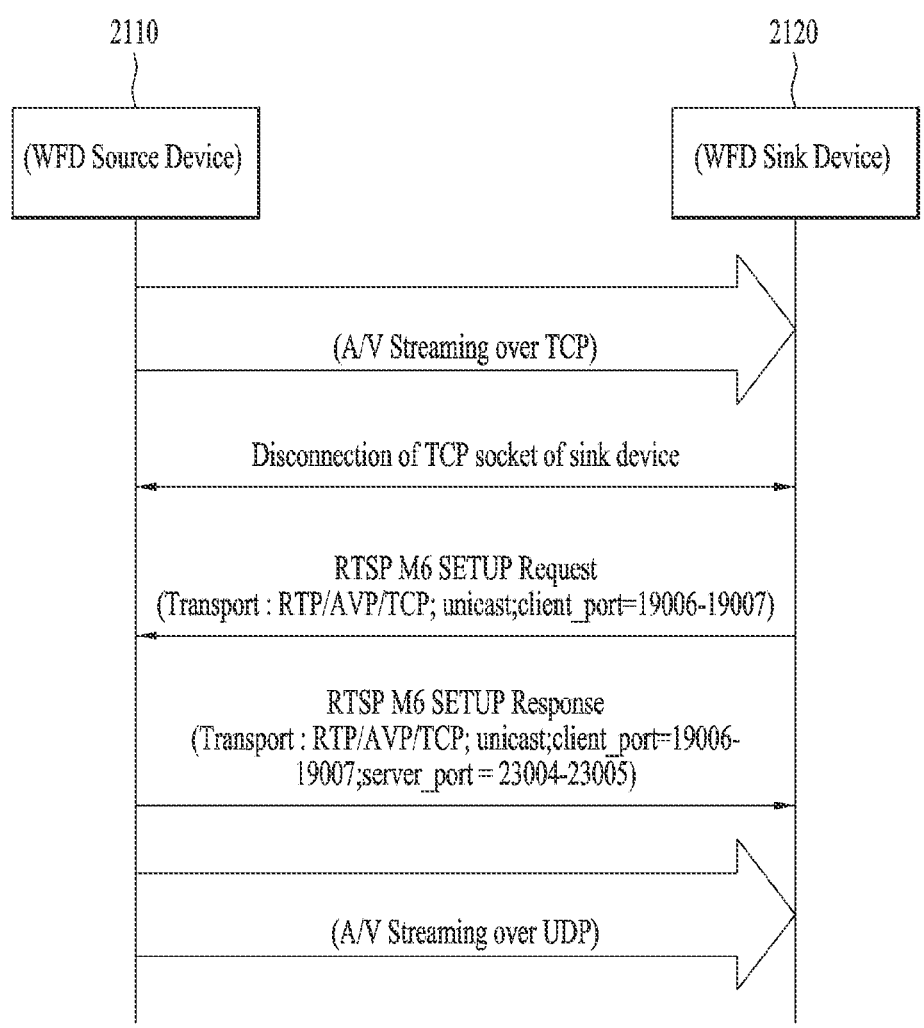
FIG. 21 is a diagram illustrating a transport recovery method when a TCP socket of a WFD sink device is disconnected.

FIG. 21 is a diagram illustrating a transport recovery method when a TCP socket of a WFD sink device is disconnected.

Referring to FIG. 21, a WFD source device 2110 may provide A/V streaming to a WFD sink device 2120 over TCP. In this case, a TCP socket of the WFD sink device 2120 may be disconnected.

For example, the WFD sink device 2120 may recognize that the TCP socket has been disconnected and perform a procedure for transport recovery. As an example, the WFD sink device 2120 may use an RTSP M6 request message (or RTSP M6 setup request message) to recover TCP. The RTSP M6 request message may include client port information for TCP. The client port information may include RTP port information and RTCP port information. That is, the WFD sink device 2120 may include the client port information desired to be used as a TCP client in the RTSP M6 request message. The RTSP M6 request message may include information about an A/V streaming method or type and the information included in the RTSP M6 request message is not limited to the above-described embodiment. In addition, the RTSP M6 request message may include information indicating that the message is for TCP recovery. That is, the RTSP M6 request message may include indication information about TCP recovery.

Thereafter, the WFD source device 2110 may transmit an RTSP M6 response message (or RTSP M6 setup response message) to the WFD sink device 2120 as a response to the RTSP M6 request message. The RTSP M6 response message may include client port information and server port information. The server port information may include RTP port and RTCP port information. That is, the RTSP M6 response message may include port information about the WFD source device 2110 serving as a TCP server. Next, the WFD source device 2110 and the WFD sink device 2120 may recover TCP. The WFD source device 2110 may provide A/V streaming to the WFD sink device 2120 over TCP.

Figure 22:
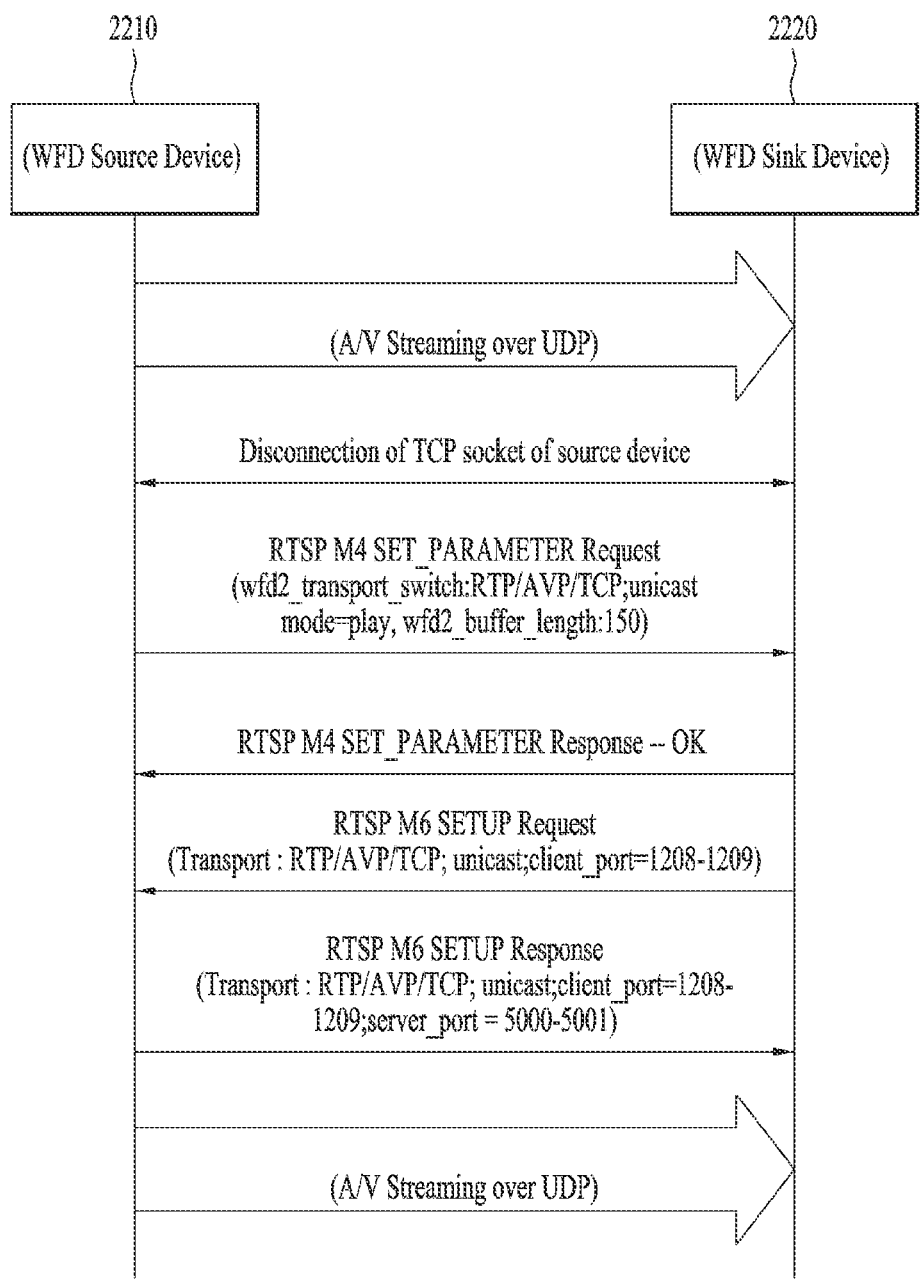
FIG. 22 is a diagram illustrating a transport switching method when a TCP socket of a WFD source device is disconnected.

FIG. 22 is a diagram illustrating a transport switching method when a TCP socket of a WFD source device is disconnected.

Referring to FIG. 22, a WFD source device 2210 may provide A/V streaming to a WFD sink device 2220 over TCP. In this case, a TCP socket of the WFD source device 2210 may be disconnected. The WFD source device 2210 may recognize that a socket thereof has been disconnected and autonomously perform a procedure for transport switching to UDP.

For example, the WFD source device 2210 may transmit an RTSP M4 request message (or RTSP M4 set_parameter request message) to the WFD sink device 2220 for transport switching to UDP. Herein, the RTSP M4 request message may include information indicating transport switching. Next, the WFD sink device 2220 may transmit an RTSP M4 response message (or RTSP M4 set_parameter response message) to the WFD source device 2210. For example, the RTSP M4 response message may include information as to whether to permit switching, which is the same as described above.

Next, the WFD sink device 2220 may transmit an RTSP M6 request message (or RTSP M6 setup request message) to the WFD source device 2210. The RTSP M6 request message may include client port information for UDP. The client port information may include RTP port information and RTCP port information. That is, the WFD sink device 2220 may include the client port information desired to be used as a UDP client in the RTSP M6 request message. The RTSP M6 request message may include information about an A/V streaming method or type and the information included in the RTSP M6 request message is not limited to the above-described embodiment. In addition, the RTSP M6 request message may include information indicating that the message is for switching to UDP. That is, the RTSP M6 request message may include indication information about switching to UDP.

Thereafter, the WFD source device 2210 may transmit an RTSP M6 response message (or RTSP M6 setup response message) to the WFD sink device 2220 as a response to the RTSP M6 request message. The RTSP M6 response message may include client port information and server port information. The server port information may include RTP port information and RTCP port information. That is, the RTSP M6 response message may include port information about the WFD source device 2210 serving as a UDP server. Next, the WFD source device 2210 and the WFD sink device 2220 may switch the transport from TCP to UDP. The WFD source device 2210 may provide A/V streaming to the WFD sink device 2220 over the switched UDP.

Figure 23:
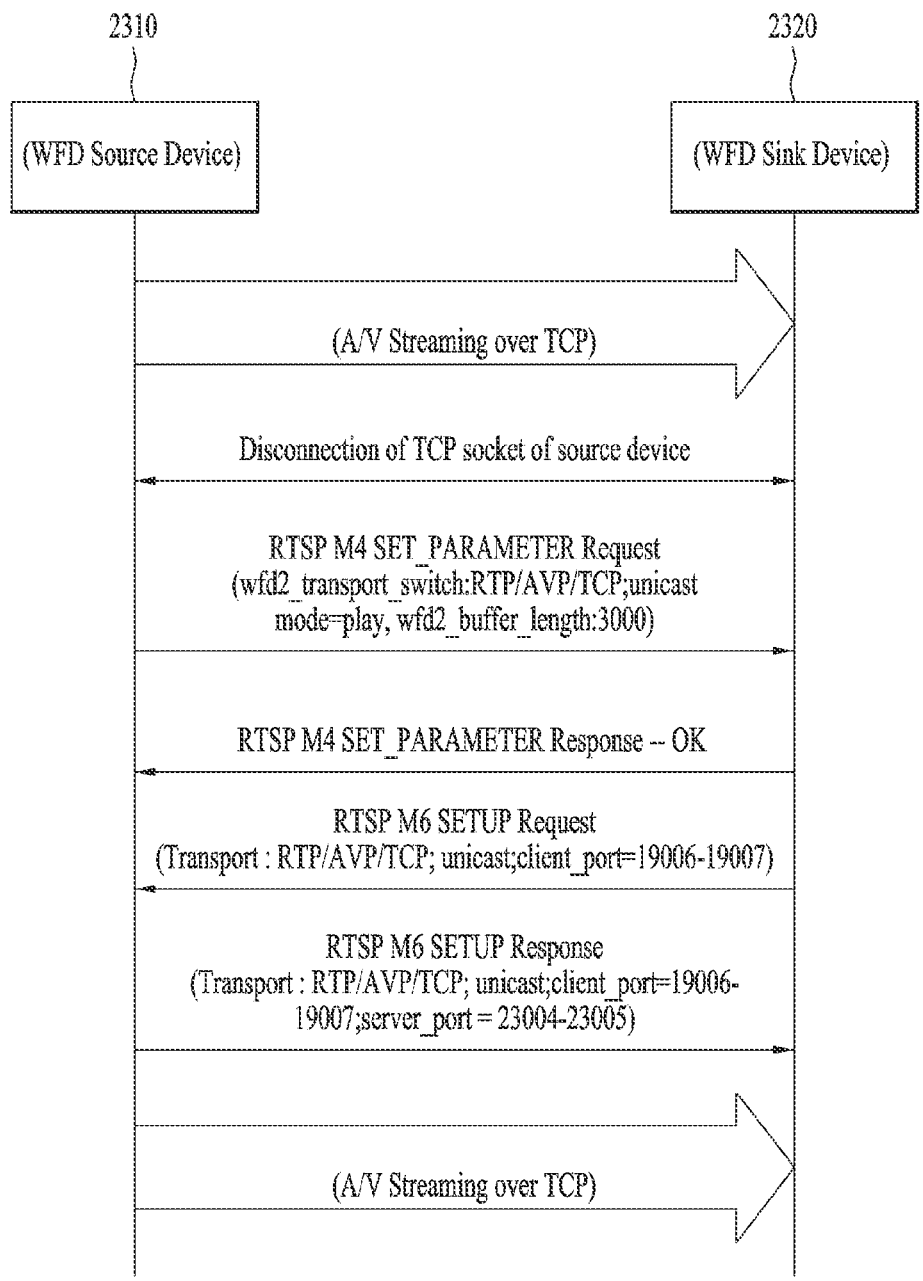
FIG. 23 is a diagram illustrating a transport recovery method when a TCP socket of a WFD source device is disconnected.

FIG. 23 is a diagram illustrating a transport recovery method when a TCP socket of a WFD source device is disconnected.

Referring to FIG. 23, a WFD source device 2310 may provide A/V streaming to a WFD sink device 2320 over TCP. In this case, a TCP socket of the WFD source device 2310 may be disconnected. The WFD source device 2310 may recognize that a socket thereof has been disconnected and autonomously perform a procedure for TCP recovery.

For example, the WFD source device 2310 may transmit an RTSP M4 request message (or RTSP M4 set_parameter request message) to the WFD sink device 2320 for recovering TCP. Herein, the RTSP M4 request message may include information indicating transport recovery. Next, the WFD sink device 2320 may transmit an RTSP M4 response message (or RTSP M4 set_parameter response message) to the WFD source device 2310. For example, the RTSP M4 response message may include information as to whether to permit transport recovery, which is the same as described above.

Next, the WFD sink device 2320 may transmit an RTSP M6 request message (or RTSP M6 setup request message) to the WFD source device 2310. The RTSP M6 request message may include client port information for TCP. The client port information may include RTP port information and RTCP port information. That is, the WFD sink device 2320 may include the client port information desired to be used as a TCP client in the RTSP M6 request message. The RTSP M6 request message may include information about an A/V streaming method or type and the information included in the RTSP M6 request message is not limited to the above-described embodiment. In addition, the RTSP M6 request message may include information indicating that the message is for TCP recovery. That is, the RTSP M6 request message may include indication information about TCP recovery.

Thereafter, the WFD source device 2310 may transmit an RTSP M6 response message (or RTSP M6 setup response message) to the WFD sink device 2320 as a response to the RTSP M6 request message. The RTSP M6 response message may include client port information and server port information. The server port information may include RTP port information and RTCP port information. That is, the RTSP M6 response message may include port information about the WFD source device 2310 serving as a TCP server. Next, the WFD source device 2310 and the WFD sink device 2320 may recover TCP. The WFD source device 2310 may provide the A/V streaming to the WFD sink device 2320 over TCP.

With regard to FIGS. 19 to 23, if the TCP transport cannot be used (TCP transport is lost) as in the case in which the socket of the TCP transport is disconnected, the WFD sink device may perform a procedure for TCP protocol recovery by transmitting the RTSP M6 message to the WFD source device, as described above. If the WFD sink device and the WFD source device cannot recover TCP, a WFD session may be again established through UDP. Namely, after the transport recovery procedure is first performed, if recovery cannot be performed, the transport switching procedure may be performed. However, this is not limited to the above-described embodiment. While the above description has been given based on TCP, even when UDP is used, the transport recovery procedure may be performed first and, if recovery cannot be performed, the transport switching procedure may be performed. However, this is not limited to the above-described embodiment.

In the above-described embodiment, if the TCP socket is disconnected, the WFD sink device may transmit a TCP connection setup packet to the WFD source device. Herein, the WFD sink device and the WFD source device may exchange the packet through 3-way handshake. That is, the WFD sink device and the WFD source device may exchange a message for the packet. If the above process is ended, the WFD sink device and the WFD source device may exchange an RTSP packet. If a TCP connection is ended, a capability negotiation procedure and a session establishment procedure may be performed. The session establishment procedure may be performed based on UDP. That is, as described above, information exchange may be performed through TCP in the control plane and information exchange may be performed through TCP or UDP in the control plane. If the TCP socket is disconnected, the TCP socket may be connected by exchanging a packet for TCP connection setup in the control plane. Thus, an RTSP message can be exchanged.

If the TCP transport is disconnected and transport switching to UDP is performed, TCP connection is performed in the control plane so that the RTSP packet may be exchanged through 3-way handshake as described above and session establishment may be performed based on UDP so that transport switching to UDP may be performed. However, this process is not limited the above-described embodiment.

Figure 24:
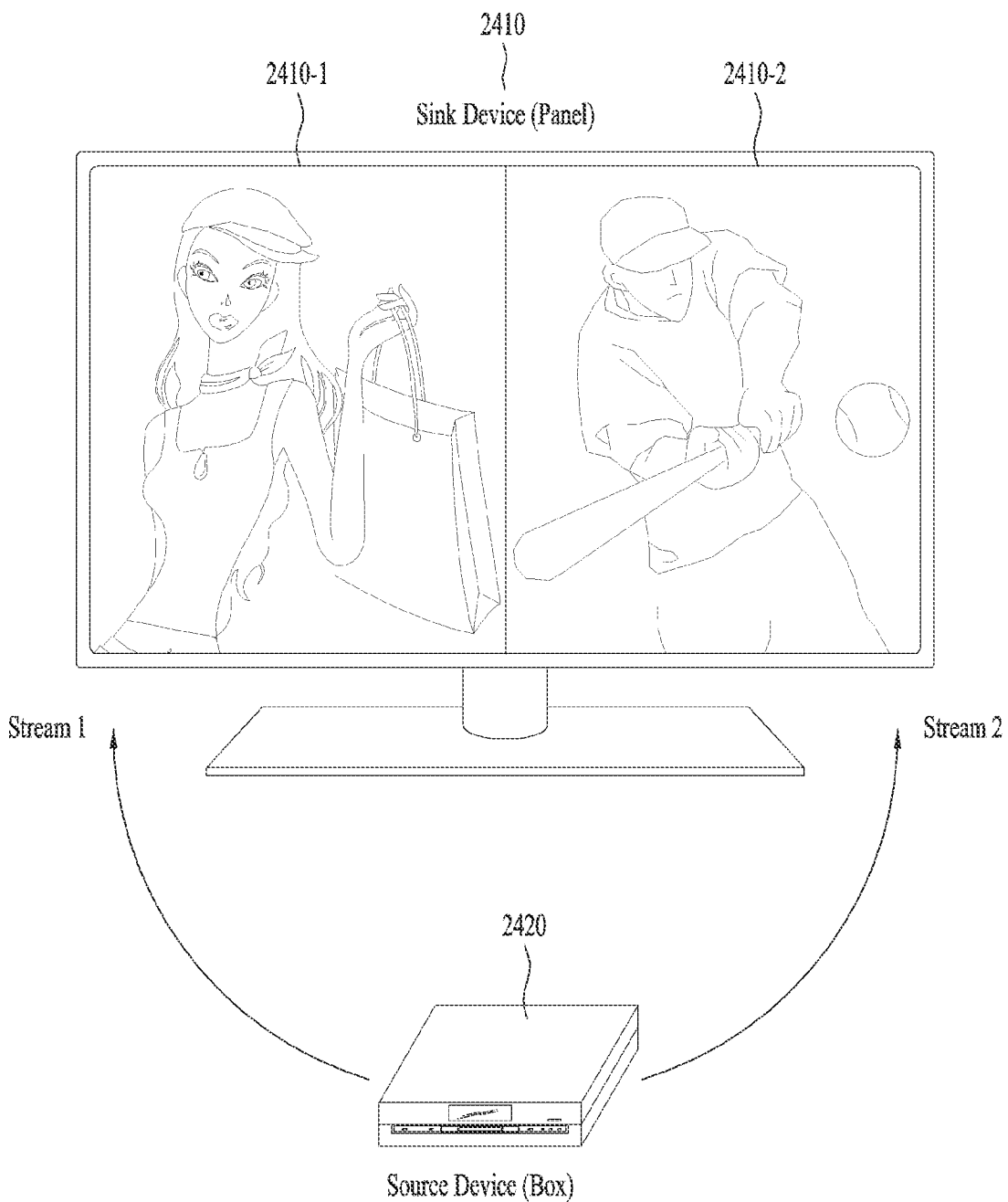
FIG. 24 is a diagram illustrating a method in which a WFD source device provides a plurality of streaming to a WFD sink device.
Figure 25:
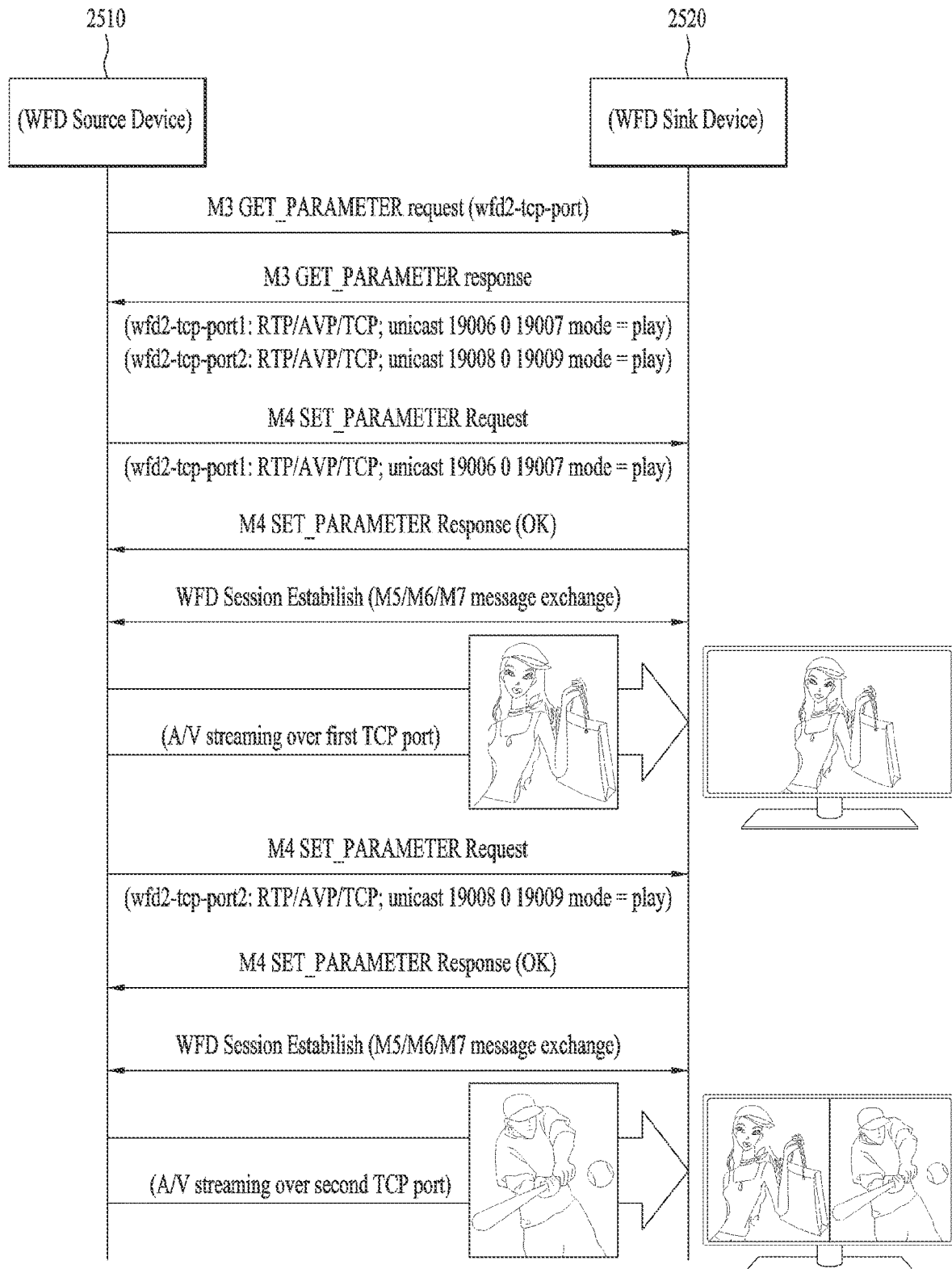
FIG. 25 is a diagram illustrating a method in which a WFD source device provides a plurality of streaming to a WFD sink device.

FIGS. 24 and 25 are diagrams illustrating a method in which a WFD source device provides a plurality of streaming to a WFD sink device.

As described earlier, a WFD source device 2420 may provide A/V streaming to a WFD sink device 2410 as real-time data. The WFD source device 2420 may provide the A/V streaming to the WFD sink device 2410 using TCP or UDP as described above.

As another example, referring to FIG. 24, the WFD source device 2420 may provide a plurality of streaming to the WFD sink device 2410. That is, the WFD sink device 2410 may simultaneously display a plurality of content provided by the WFD source device 2420. For example, the WFD sink device 2410 may display content of the WFD source device 2420 based on Picture-In-Picture (PIP) as sink implementation technology. In addition, the WFD sink device 2410 may provide the streams as content through the above-described TCP or UDP. With regard to provided content, a transport switching or recovery procedure may be performed, when necessary, using the above-described method and is not limited to the above-described embodiment. When the WFD source device 2420 provides a plurality of content to the WFD sink device 2410, the WFD source device 2420 may provide first content based on a first stream to a first region 2410-1 of the WFD sink device 2410. The WFD source device 2420 may provide second content based on a second stream to a second region 2410-2 of the WFD sink device 2410. The first region 2410-1 and the second region 2410-2 may be regions which are arbitrarily divided in a region in which the WFD sink device 2410 can display content. The size and location of each region may be changed and are not limited to the above-described embodiment. In addition, the size and location of each region may be controlled by the WFD sink device 2410. In addition, as an example, the size and location of each region may be configured based on information received from the WFD source device 2420 and are not limited to the above-described embodiment. As another example, the A/V streaming may be separately provided. For example, as a video streaming, a first video streaming for the first content may be provided in the first region 2410-1 and a second video streaming for the second content may be provided in a second region 2410-2. Meanwhile, as an audio streaming, only one of a first audio streaming for the first content and a second audio streaming for the second content may be provided. That is, in consideration of audio output of the WFD sink device 2410, only either the first audio streaming of the first content or the second audio streaming of the second content may be provided. One audio streaming provided to the WFD sink device 2410 may be controlled by the WFD sink device 2410. In addition, as another example, configuration information about the audio streaming provided to the WFD sink device 2410 may be received from the WFD source device 2420 and is not limited to the above-described embodiment.

FIG. 25 illustrates a procedure of providing multiple contents by a WFD source device 2510 to a WFD sink device 2520. The WFD source device 2510 may transmit an RTSP M3 request message to the WFD sink device 2520. The RTSP M3 request message may be a message "RTSP M3 GET_PARAMETER Request" for requesting transport information. Next, the WFD sink device 2520 may transmit "RTSP M3 GET_PARAMETER Response" as an RTSP M3 response message to the WFD source device 2510. The message that the WFD sink device 2520 transmits may include information about configurations of a plurality of transports. For example, the message that the WFD sink device transmits may include information about a first transport and information about a second transport. Next, the WFD source device 2510 may transmit an RTSP M4 request message to the WFD sink device 2520. The RTSP M4 request message may be "RTSP M4 SET_PARAMETER Request". The RTSP M4 request message may include information about a configuration of the first transport among the first transport and second transport. Next, the WFD sink device 2520 may transmit an RTSP M4 response message. The RTSP M4 response message may be "RTSP M4 SET_PARAMETER Response". This message may include information indicating whether a streaming can be provided over the first transport. If the message indicates that the streaming can be provided over the first transport, the WFD source device 2510 may provide a first streaming for first content to the WFD sink device 2520 over the first transport. In this case, the WFD sink device 2520 may first display the first streaming for the first content. Next, the WFD source device 2510 may transmit an RTSP M4 request message to the WFD sink device 2520. The RTSP M4 request message may be "RTSP M4 SET_PARAMETER Request". The RTSP M4 request message may include information about a configuration of the second transport among the first transport and the second transport. That is, in a state in which the streaming for the first transport is provided, additional content may be provided through the second transport. The WFD sink device 2520 may transmit an RTSP M4 response message. The RTSP M4 response message may be "RTSP M4 SET_PARAMETER Response". In this case, this message may include indicating whether a streaming can be provided over the second transport. If the message indicates that the streaming can be provided over the first transport, the WFD source device 2510 may provide a second streaming for second content to the WFD sink device 2520 over the second transport. As described above, the first content may be displayed in a first region of the sink device 2520 and the second contend may be display in a second region of the sink device 2520, which is the same as described above. The first transport and the second transport described with reference to FIGS. 24 and 25 may be the same type of transports. That is, both the first transport and the second transport may be TCPs. Alternatively, both the first transport and the second transport may be UDP. As another embodiment, if the first transport is configured as TCP, the second transport may be configured as UDP. If the first transport is configured as UDP, the second transport may be configured as TCP and this is not limited to the above embodiment.

Figure 26:
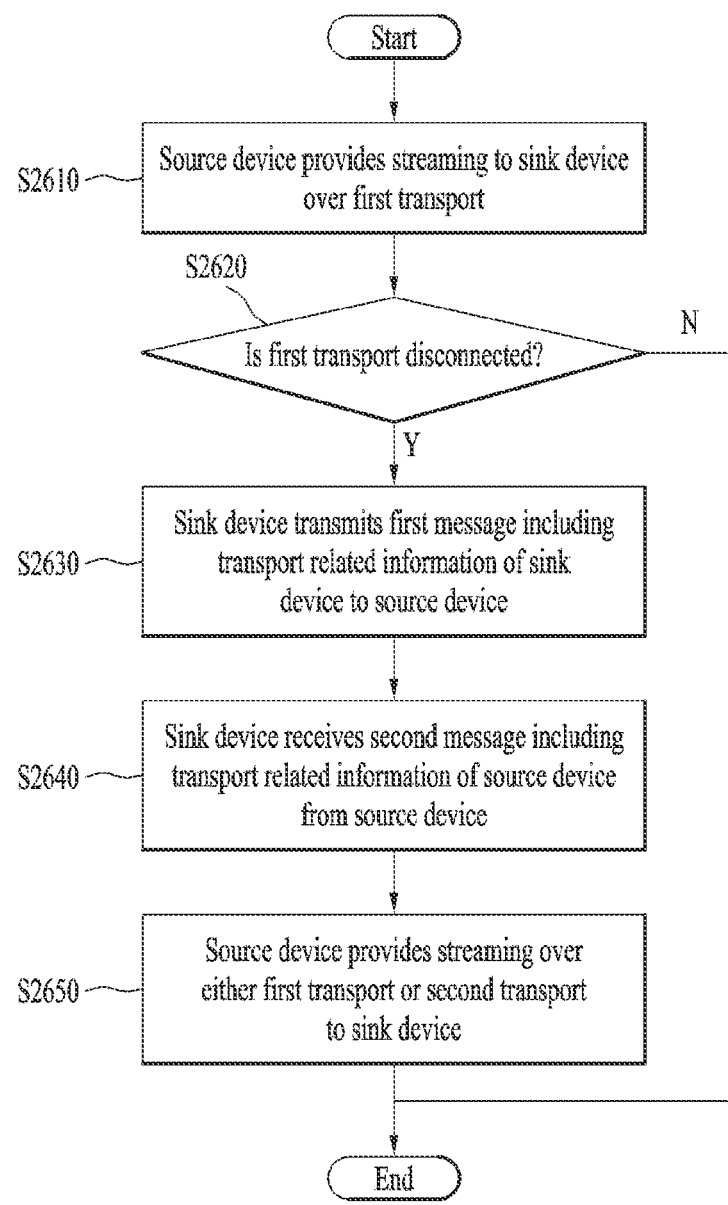
FIG. 26 is a flowchart illustrating a method in which a sink device receives a streaming according to an embodiment of the present disclosure.

FIG. 26 is a flowchart illustrating a method in which a sink device receives a streaming according to an embodiment of the present disclosure.

A source device may provide a streaming to a sink device over a first transport (S2610). As described with reference to FIGS. 11 to 23, the source device may be a WFD source device and the sink device may be a WFD sink device. The first transport over which the streaming is provided may be TCP or UDP.

If the first transport is disconnected (S2620), the sink device may transmit a first message including transport related information of the sink device to the source device (S2630). As described with reference to FIGS. 11 to 23, if a socket of the source device is disconnected, the first transport may be disconnected. In addition, if a socket of the sink device is disconnected, the first transport may be disconnected. For example, if the socket of the sink device is disconnected, the sink device may transmit the first message including the transport related information to the source device. The first message may be the above-described RTSP M6 request message. If the socket of the sink device is disconnected, the sink device may transmit transport related information for transport switching in the first message. In this case, if an existing connection is via TCP, the first message may include information about UDP. Meanwhile, if the existing connection is via UDP, the first message may include information about TCP. If the socket of the sink device is disconnected, the sink device may transmit transport related information for transport recovery in the first message. In addition, if the first transport is connected as the socket of the source device is disconnected, the source device may transmit a third message to the sink device. The sink device may transmit a fourth message to the source device as a response to the third message and then transmit the above-described first message to the source device.

Next, the sink device may receive a second message including transport related information of the source device from the source device (S2640). As described with reference to FIGS. 11 to 23, the second message may be an RTSP M6 response message. The second message may include transport information about the sink device and transport information about the source device. In addition, the second message may include information indicating whether to permit switching or recovery, which is the same as described above.

Next, the sink device may receive the streaming over any one of the first transport and the second transport from the source device (S2650). As described with reference to FIGS. 11 to 23, if the sink device exchanges the above messages based on a transport recovery procedure, the sink device may again receive the streaming over the first transport. If the sink device exchanges the above messages based on a transport switching procedure, the sink device may receive the streaming over the switched second transport. In this case, if the first transport is TCP, the second transport may be UDP and, if the first transport is UDP, the second transport may be TCP, which is the same as described above.

Figure 27:
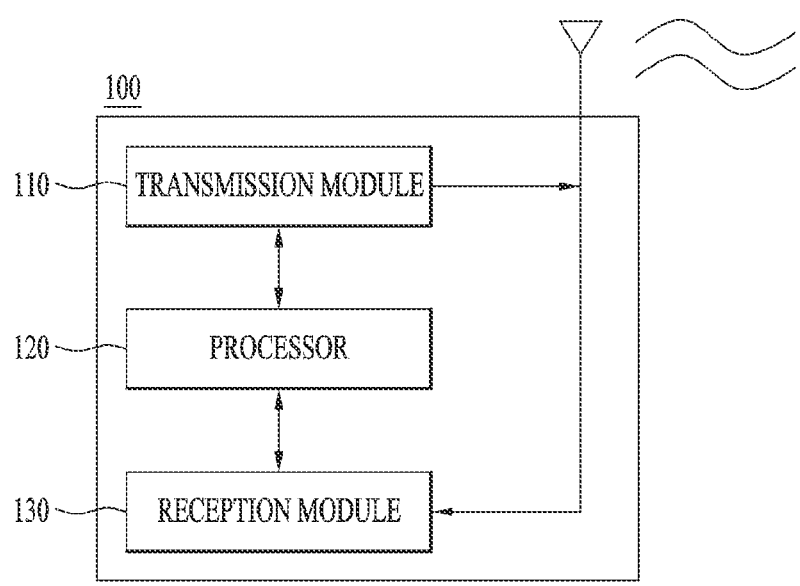
FIG. 27 is a block diagram of a terminal device according to an embodiment of the present disclosure.

FIG. 27 is a block diagram of a terminal device according to an embodiment of the present disclosure.

The terminal device may be a device supporting an ASP which can us a plurality of interfaces. The terminal device may be the above-described WFD source device or WFD sink device. The terminal device may include a transmission module 110 for transmitting a radio signal, a reception module 130 for receiving a radio signal, and a processor 120 for controlling the transmission module 110 and the reception module. The terminal device 100 may perform communication with external devices using the transmission module 110 and the reception module 130. Herein, the external devices may be other terminal devices, for example, terminal devices connected via P2P, or APs or non-APs connected via WLAN infrastructure. As another example, the external devices may be BSs. That is, the external devices may be devices capable of communicating with the terminal device 100 and are not limited to the above examples. The terminal device 100 may transmit and receive digital data such as content using the transmission module 110 and the reception module 130.

As an example, the terminal device 100 may serve as the WFD source device. In addition, the terminal device 100 may serve as the WFD sink device. If the terminal device 100 serves as the WFD sink device, the processor 120 of the terminal device 100 may receive a streaming over a first transport from the source device. If the first transport is disconnected, the terminal device 120 may transmit a first message including transport related information of the WFD sink device to the WFD source device. The first transport may be TCP or UDP. The first message may be an RTSP M6 request message which is the same as described with reference to FIGS. 11 to 24. The processor 120 of the terminal device 100 may receive a second message including transport related information of the source device from the source device. Herein, the second message may be the above-described RTSP M6 response message, which is the same as described with reference to FIGS. 11 to 24. The processor 120 of the terminal device 100 may receive the streaming over any one of the first transport and the second transport from the source device. In this case, as described with reference to FIGS. 11 to 24, when the above messages are exchanged based on a transport switching procedure, the sink device may receive the streaming from the source device over the switched second transport. If the above-described messages are exchanged based on a transport recovery procedure, the sink device may receive the streaming from the source device over the recovered first transport. In this case, if the first transport is TCP, the second transport may be UDP and, if the first transport is UDP, the second transport may be TCP, which are the same as described above.

The above-described embodiments of the present invention may be implemented by using diverse means. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of means that have already been disclosed.

As described above, a detailed description of the preferred mode for carrying out the present invention disclosed herein is provided so that anyone skilled in the art can be capable of realizing and performing the present invention. Although the description provided above is described with reference to the preferred mode for carrying out the present invention, it will be apparent to those skilled in the art that the present invention may be diversely corrected and modified without departing from the spirit and scope of the present invention, which are disclosed in the appended claims of the present invention disclosed below. Therefore, the present invention will not be limited only to the exemplary embodiments disclosed herein. Instead, the present invention seeks to provide a broader scope of the present invention best fitting the disclosed principles and new characteristics of the invention described herein.

Apparatus and method inventions are mentioned in this disclosure and descriptions of both the apparatus and method inventions may be complementarily applied to each other.

INDUSTRIAL APPLICABILITY

Although the above description has been given based on a WFD device in a wireless communication system, the description may be applied to various terminals in the wireless communication system in addition to the WFD device.

What is claimed is:

1. A method for transmitting a streaming by a source device to a sink device through a wireless communication, the method comprising:
   transmitting, by the source device to the sink device, the streaming over a transport for the sink device based on a protocol that is one of a transmission control protocol (TCP) or a user datagram protocol (UDP);
   based on a disconnection of the transport for the sink device, performing a recovery procedure with the sink device for recovery of the transport for the sink device; and
   transmitting, by the source device to the sink device, the streaming over the recovered transport for the sink device based on the protocol that is switched to the other of the one of the TCP or the UDP upon the recovery of the transport for the sink device,
   wherein performing the recovery procedure comprises:
   receiving, by the source device from the sink device, a Real-Time Streaming Protocol (RTSP) M6 request message including transport related information of the sink device for switching the protocol to the other of the one of the TCP or the UDP; and
   transmitting, by the source device to the sink device, an RTSP M6 response message in response to the RTSP M6 request message.

2. The method according to claim 1, wherein the RTSP M6 request message includes port information about the sink device and the RTSP M6 response message includes the port information about the sink device and port information about the source device.

3. The method according to claim 2, wherein the RTSP M6 response message further includes information indicating whether to permit the recovery.

4. The method according to claim 3, wherein the source device transmits the streaming over the recovered transport only when the RTSP M6 response message indicates permission of the recovery.

5. The method according to claim 2, wherein the port information about the sink device is related to client ports 19006 to 19007, and the port information about the source device is related to server ports 23004 to 23005.

6. The method according to claim 1, wherein the source device receives the RTSP M6 request message from the sink device after transmitting a message for triggering transmission of the RTSP M6 request message.

7. The method according to claim 1, wherein the recovery procedure further comprises:
   as part of the recovery of the transport, performing a capability negotiation procedure with the sink device.

8. The method according to claim 1, wherein the source device is a Wi-Fi Display (WFD) source device and the sink device is a WFD sink device.

9. A non-transitory computer readable medium recorded thereon a program for performing the method according to claim 1.

10. A source device for transmitting a streaming to a sink device through wireless communication, the source device comprising:
- a transceiver; and
- a processor controls the transceiver to:
- transmit, to the sink device, the streaming over a transport for the sink device based on a protocol that is one of a transmission control protocol (TCP) or a user datagram protocol (UDP);
- based on a disconnection of the transport for the sink device, perform a recovery procedure with the sink device for recovery of the transport for the sink device; and
- transmit, to the sink device, the streaming over the recovered transport for the sink device based on the protocol that is switched to the other of the one of the TCP or the UDP upon the recovery of the transport for the sink device,
- wherein the recovery procedure comprises:
- reception of a Real-Time Streaming Protocol (RTSP) M6 request message from the sink device, including transport related information of the sink device for switching the protocol to the other of the one of the TCP or the UDP; and
- transmission of an RTSP M6 response message to the sink device, in response to the RTSP M6 request message.

11. A method for receiving a streaming from a source device by a sink device through wireless communication, the method comprising:
- receiving, from the source device by the sink device, the streaming over a transport of the sink device based on a protocol that is one of a transmission control protocol (TCP) or a user datagram protocol (UDP);
- based on a disconnection of the transport of the sink device, performing a recovery procedure with the source device for recovery of the transport of the sink device; and
- receiving, from the source device by the sink device, the streaming over the recovered transport of the sink device based on the protocol that is switched to the other of the one of the TCP or the UDP upon the recovery of the transport of the sink device,
- wherein performing the recovery procedure comprises:
- transmitting, to the source device by the sink device, a Real-Time Streaming Protocol (RTSP) M6 request message including transport related information of the sink device for switching the protocol to the other of the one of the TCP or the UDP; and
- receiving, from the source device by the sink device, an RTSP M6 response message in response to the RTSP M6 request message.

12. The method according to claim 11, wherein the RTSP M6 request message includes port information about the sink device and the RTSP M6 response message includes the port information about the sink device and port information about the source device.

13. The method according to claim 12, wherein the RTSP M6 response message further includes information indicating whether to permit the recovery.

14. The method according to claim 13, wherein the sink device receives the streaming over the recovered transport only when the RTSP M6 response message indicates permission of the recovery.

15. The method according to claim 12, wherein the port information about the sink device is related to client ports 19006 to 19007, and the port information about the source device is related to server ports 23004 to 23005.

16. The method according to claim 11, wherein the sink device transmits the RTSP M6 request message to the source device after receiving a message for triggering transmission of the RTSP M6 request message.

17. The method according to claim 11, wherein the recovery procedure further comprises:
- as part of the recovery of the transport, performing a capability negotiation procedure with the source device.

18. The method according to claim 11, wherein the source device is a Wi-Fi Display (WFD) source device and the sink device is a WFD sink device.

19. A non-transitory computer readable medium recorded thereon a program for performing the method according to claim 11.

20. A sink device for receiving a streaming from a source device through wireless communication, the sink device comprising:
- a transceiver; and
- a processor controls the transceiver to:
- receive, from the source device, the streaming over a transport of the sink device based on a protocol that is one of a transmission control protocol (TCP) or a user datagram protocol (UDP);
- based on a disconnection of the transport of the sink device, to perform a recovery procedure with the source device for recovery of the transport of the sink device; and
- receive, from the source device, the streaming over the recovered transport of the sink device based on the protocol that is switched to the other of the one of the TCP or the UDP upon the recovery of the transport of the sink device,
- wherein performing the recovery procedure comprises:
- transmission of a Real-Time Streaming Protocol (RTSP) M6 request message to the source device, including transport related information of the sink device for switching the protocol to the other of the one of the TCP or the UDP; and
- reception of an RTSP M6 response message from the source device, in response to the RTSP M6 request message.

\* \* \* \* \*